United States Patent
Wray et al.

(10) Patent No.: US 11,500,380 B2
(45) Date of Patent: Nov. 15, 2022

(54) AUTONOMOUS VEHICLE OPERATIONAL MANAGEMENT INCLUDING OPERATING A PARTIALLY OBSERVABLE MARKOV DECISION PROCESS MODEL INSTANCE

(71) Applicants: Nissan North America, Inc., Franklin, TN (US); The University of Massachusetts, Boston, MA (US)

(72) Inventors: Kyle Wray, Amherst, MA (US); Stefan Witwicki, San Carlos, CA (US); Shlomo Zilberstein, Amherst, MA (US); Liam Pedersen, San Francisco, CA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 605 days.

(21) Appl. No.: 16/473,148

(22) PCT Filed: Feb. 10, 2017

(86) PCT No.: PCT/US2017/017527
§ 371 (c)(1),
(2) Date: Jun. 24, 2019

(87) PCT Pub. No.: WO2018/147874
PCT Pub. Date: Aug. 16, 2018

(65) Prior Publication Data
US 2020/0097003 A1 Mar. 26, 2020

(51) Int. Cl.
*G05D 1/00* (2006.01)
*G06N 7/00* (2006.01)
*G08G 1/0967* (2006.01)

(52) U.S. Cl.
CPC .......... *G05D 1/0088* (2013.01); *G06N 7/005* (2013.01); *G08G 1/096725* (2013.01); *G05D 2201/0213* (2013.01); *G08G 1/096791* (2013.01)

(58) Field of Classification Search
None
See application file for complete search history.

(56) References Cited

U.S. PATENT DOCUMENTS

| 4,751,570 A | 6/1988 | Robinson |
| 5,615,116 A | 3/1997 | Gudat et al. |

(Continued)

FOREIGN PATENT DOCUMENTS

| CN | 103945486 A | 7/2014 |
| CN | 105216795 A | 1/2016 |

(Continued)

OTHER PUBLICATIONS

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

(Continued)

*Primary Examiner* — Jonathan M Dager
(74) *Attorney, Agent, or Firm* — Young Basile Hanlon & MacFarlane, P.C.

(57) ABSTRACT

Autonomous vehicle operational management may include traversing, by an autonomous vehicle, a vehicle transportation network. Traversing the vehicle transportation network may include operating a scenario-specific operational control evaluation module instance, wherein the scenario-specific operational control evaluation module instance is an instance of a scenario-specific operational control evaluation module, wherein the scenario-specific operational control (Continued)

evaluation module implements a partially observable Markov decision process. Traversing the vehicle transportation network may include receiving a candidate vehicle control action from the scenario-specific operational control evaluation module instance, and traversing a portion of the vehicle transportation network based on the candidate vehicle control action.

17 Claims, 9 Drawing Sheets

(56) References Cited

U.S. PATENT DOCUMENTS

| | | | |
|---|---|---|---|
| 8,762,006 | B2 | 6/2014 | Miller |
| 8,781,669 | B1 | 7/2014 | Teller et al. |
| 8,849,483 | B2 | 9/2014 | Kuwata et al. |
| 8,884,782 | B2 | 11/2014 | Rubin et al. |
| 9,081,651 | B2 | 7/2015 | Filev et al. |
| 9,103,671 | B1 | 8/2015 | Breed et al. |
| 9,134,731 | B2 | 9/2015 | Healey et al. |
| 9,494,439 | B1 | 11/2016 | Ross et al. |
| 9,568,915 | B1 | 2/2017 | Berntorp et al. |
| 9,646,428 | B1 | 5/2017 | Konrardy et al. |
| 9,972,054 | B1 | 5/2018 | Konrardy et al. |
| 10,029,701 | B2 | 7/2018 | Gordon et al. |
| 10,061,326 | B2 | 8/2018 | Gordon et al. |
| 10,093,322 | B2 | 10/2018 | Gordon et al. |
| 10,126,135 | B2 | 11/2018 | Mortazavi et al. |
| 10,185,998 | B1 | 1/2019 | Konrardy et al. |
| 10,319,039 | B1 | 6/2019 | Konrardy et al. |
| 10,371,130 | B2 | 8/2019 | Deng et al. |
| 10,380,886 | B2 * | 8/2019 | Ran .................. G08G 1/0129 |
| 10,408,638 | B2 | 9/2019 | Berntorp et al. |
| 10,514,705 | B2 * | 12/2019 | Shalev-Shwartz ... G05D 1/0246 |
| 10,518,764 | B2 | 12/2019 | Cao et al. |
| 10,538,252 | B2 | 1/2020 | Ebina et al. |
| 10,543,828 | B2 | 1/2020 | Stayton et al. |
| 10,599,155 | B1 | 3/2020 | Konrardy et al. |
| 10,990,096 | B2 | 4/2021 | Isele et al. |
| 11,086,318 | B1 * | 8/2021 | Davis .................. G05D 1/0291 |
| 2004/0068351 | A1 | 4/2004 | Solomon |
| 2005/0057370 | A1 | 3/2005 | Warrior et al. |
| 2007/0021915 | A1 | 1/2007 | Breed et al. |
| 2007/0168096 | A1 | 7/2007 | Boutin |
| 2008/0097699 | A1 | 4/2008 | Ono |
| 2009/0088916 | A1 | 4/2009 | Elgersma et al. |
| 2009/0140887 | A1 | 6/2009 | Breed et al. |
| 2009/0299496 | A1 * | 12/2009 | Cade ...................... G05B 17/02 700/29 |
| 2009/0326819 | A1 | 12/2009 | Taguchi |
| 2010/0223216 | A1 * | 9/2010 | Eggert .................. G06V 10/95 706/12 |
| 2011/0016067 | A1 | 1/2011 | Levchuk et al. |
| 2011/0102195 | A1 | 5/2011 | Kushi et al. |
| 2012/0150437 | A1 | 6/2012 | Zeng et al. |
| 2012/0233102 | A1 | 9/2012 | James |
| 2012/0290152 | A1 | 11/2012 | Cheung et al. |
| 2013/0318023 | A1 * | 11/2013 | Morimura .............. G06N 20/00 706/46 |
| 2014/0067483 | A1 | 3/2014 | Jeong et al. |
| 2014/0136414 | A1 | 5/2014 | Abhyanker |
| 2014/0222277 | A1 | 8/2014 | Tsimhoni et al. |
| 2014/0244114 | A1 | 8/2014 | Matsubara |
| 2014/0309838 | A1 | 10/2014 | Ricci |
| 2015/0039157 | A1 | 2/2015 | Wolfe et al. |
| 2015/0070156 | A1 | 3/2015 | Milburn, Jr. |
| 2015/0081156 | A1 | 3/2015 | Trepagnier et al. |
| 2015/0105961 | A1 | 4/2015 | Callow |
| 2015/0106010 | A1 | 4/2015 | Martin et al. |
| 2015/0153735 | A1 | 6/2015 | Clarke et al. |
| 2015/0183431 | A1 | 7/2015 | Nanami |
| 2015/0210274 | A1 | 7/2015 | Clarke et al. |
| 2015/0253772 | A1 | 9/2015 | Solyom et al. |
| 2015/0329130 | A1 | 11/2015 | Carlson et al. |
| 2015/0345966 | A1 * | 12/2015 | Meuleau ............ G01C 21/3469 701/23 |
| 2015/0345967 | A1 * | 12/2015 | Meuleau ............ G01C 21/3453 701/25 |
| 2015/0375748 | A1 | 12/2015 | Nagase et al. |
| 2016/0068158 | A1 | 3/2016 | Elwart et al. |
| 2016/0129907 | A1 | 5/2016 | Kim et al. |
| 2016/0161270 | A1 * | 6/2016 | Okumura .......... G08G 1/096725 701/23 |
| 2016/0209842 | A1 | 7/2016 | Thakur et al. |
| 2016/0209843 | A1 | 7/2016 | Meuleau et al. |
| 2016/0209848 | A1 | 7/2016 | Kojo et al. |
| 2016/0260328 | A1 | 9/2016 | Mishra et al. |
| 2016/0318511 | A1 | 11/2016 | Rangwala |
| 2016/0318515 | A1 * | 11/2016 | Laur ................. B60W 30/18154 |
| 2016/0334230 | A1 | 11/2016 | Ross et al. |
| 2016/0334797 | A1 | 11/2016 | Ross et al. |
| 2016/0335892 | A1 | 11/2016 | Okada et al. |
| 2016/0339919 | A1 | 11/2016 | Habu et al. |
| 2016/0375766 | A1 | 12/2016 | Konet et al. |
| 2016/0375768 | A1 * | 12/2016 | Konet ................... G08G 1/166 348/148 |
| 2017/0008168 | A1 * | 1/2017 | Weng ........................ G06N 3/08 |
| 2017/0010108 | A1 | 1/2017 | Shashua |
| 2017/0010617 | A1 | 1/2017 | Shashua et al. |
| 2017/0031361 | A1 * | 2/2017 | Olson .................. B60W 30/0956 |
| 2017/0032590 | A1 | 2/2017 | Stefan et al. |
| 2017/0038777 | A1 | 2/2017 | Harvey |
| 2017/0090478 | A1 | 3/2017 | Blayvas et al. |
| 2017/0090480 | A1 | 3/2017 | Ho et al. |
| 2017/0102700 | A1 | 4/2017 | Kozak |
| 2017/0124476 | A1 | 5/2017 | Levinson et al. |
| 2017/0137025 | A1 | 5/2017 | Muto et al. |
| 2017/0158193 | A1 | 6/2017 | Lopez et al. |
| 2017/0215045 | A1 | 7/2017 | Rasal et al. |
| 2017/0225760 | A1 | 8/2017 | Sidki et al. |
| 2017/0236422 | A1 | 8/2017 | Naka et al. |
| 2017/0261325 | A1 | 9/2017 | Schroeder et al. |
| 2017/0262790 | A1 | 9/2017 | Khasis |
| 2017/0276780 | A1 | 9/2017 | Takehara et al. |
| 2017/0277193 | A1 | 9/2017 | Frazzoli et al. |
| 2017/0297576 | A1 * | 10/2017 | Halder .............. G08G 1/096844 |
| 2017/0329338 | A1 | 11/2017 | Wei et al. |
| 2017/0334451 | A1 | 11/2017 | Asakura et al. |
| 2017/0356746 | A1 | 12/2017 | Iagnemma |
| 2017/0357263 | A1 | 12/2017 | Glatfelter et al. |
| 2017/0369051 | A1 | 12/2017 | Sakai et al. |
| 2017/0369062 | A1 | 12/2017 | Saigusa et al. |
| 2017/0369067 | A1 | 12/2017 | Saigusa et al. |
| 2017/0371338 | A1 * | 12/2017 | Kamata ................ G05D 1/0274 |
| 2018/0004214 | A1 | 1/2018 | Wisniowski et al. |
| 2018/0011494 | A1 | 1/2018 | Zhu et al. |
| 2018/0029500 | A1 | 2/2018 | Katanoda |
| 2018/0032079 | A1 | 2/2018 | Nishi |
| 2018/0046191 | A1 | 2/2018 | Keller et al. |
| 2018/0129206 | A1 | 5/2018 | Harada et al. |
| 2018/0147988 | A1 | 5/2018 | Lee et al. |
| 2018/0173230 | A1 | 6/2018 | Goldman-Shenhar et al. |
| 2018/0232585 | A1 | 8/2018 | Kim |
| 2018/0290657 | A1 | 10/2018 | Ryne et al. |
| 2018/0341880 | A1 | 11/2018 | Kislovskiy et al. |
| 2018/0342033 | A1 | 11/2018 | Kislovskiy et al. |
| 2018/0348786 | A1 | 12/2018 | Yasui et al. |
| 2018/0349785 | A1 | 12/2018 | Zheng et al. |
| 2018/0373245 | A1 | 12/2018 | Nishi |
| 2019/0047584 | A1 | 2/2019 | Donnelly |
| 2019/0086549 | A1 | 3/2019 | Ushani et al. |
| 2019/0096244 | A1 * | 3/2019 | Guruva Reddiar .. G08G 1/0112 |
| 2019/0113918 | A1 * | 4/2019 | England ................ G05D 1/0274 |
| 2019/0129436 | A1 | 5/2019 | Sun et al. |
| 2019/0135281 | A1 | 5/2019 | Miura et al. |
| 2019/0193722 | A1 | 6/2019 | Yamamuro et al. |
| 2019/0196471 | A1 | 6/2019 | Vaughn et al. |
| 2019/0258268 | A1 | 8/2019 | MacNeille et al. |
| 2019/0295179 | A1 | 9/2019 | Shalev-Shwartz et al. |
| 2019/0299991 | A1 | 10/2019 | Horii et al. |
| 2019/0310632 | A1 | 10/2019 | Nakhaei Sarvedani |
| 2019/0310654 | A1 | 10/2019 | Halder |

(56) References Cited

U.S. PATENT DOCUMENTS

| | | | |
|---|---|---|---|
| 2019/0317506 A1 | 10/2019 | Ishioka | |
| 2019/0329771 A1* | 10/2019 | Wray | B60W 30/18163 |
| 2019/0329782 A1 | 10/2019 | Shalev-Shwartz et al. | |
| 2019/0359209 A1 | 11/2019 | Mizutani et al. | |
| 2020/0079377 A1 | 3/2020 | Tashiro et al. | |
| 2020/0097008 A1 | 3/2020 | Sadat et al. | |
| 2020/0098269 A1* | 3/2020 | Wray | G05D 1/0212 |
| 2020/0180647 A1* | 6/2020 | Anthony | G06V 20/56 |
| 2020/0269871 A1* | 8/2020 | Schmidt | B60W 60/0011 |
| 2020/0269875 A1* | 8/2020 | Wray | G08G 1/166 |
| 2020/0279488 A1 | 9/2020 | Shibasaki | |
| 2020/0363814 A1 | 11/2020 | He et al. | |
| 2020/0389469 A1 | 12/2020 | Litichever et al. | |
| 2020/0406906 A1 | 12/2020 | Omari et al. | |
| 2021/0089048 A1 | 3/2021 | Tran | |
| 2021/0157315 A1* | 5/2021 | Wray | G01C 21/3492 |
| 2021/0200208 A1* | 7/2021 | Wray | B60W 30/0953 |
| 2021/0237759 A1 | 8/2021 | Wray et al. | |
| 2021/0240190 A1* | 8/2021 | Wray | G06F 40/186 |
| 2021/0261123 A1* | 8/2021 | Wray | B60W 30/0956 |
| 2021/0279331 A1 | 9/2021 | Gilad et al. | |
| 2021/0294323 A1* | 9/2021 | Bentahar | B60W 50/00 |

FOREIGN PATENT DOCUMENTS

| | | |
|---|---|---|
| CN | 105620470 A | 6/2016 |
| CN | 105635849 A | 6/2016 |
| CN | 106103232 A | 11/2016 |
| CN | 106184223 A | 12/2016 |
| CN | 106428000 A | 2/2017 |
| CN | 107577227 A | 1/2018 |
| DE | 10341753 A1 | 4/2005 |
| DE | 102012005245 A1 | 9/2012 |
| DE | 102012220134 A1 | 5/2014 |
| DE | 102013212255 A1 | 12/2014 |
| DE | 102015201272 A1 | 7/2016 |
| DE | 102016203086 A1 | 8/2017 |
| EP | 2084690 A2 | 8/2009 |
| EP | 2902864 A1 | 8/2015 |
| EP | 2958783 A1 | 12/2015 |
| EP | 3273423 A1 | 1/2018 |
| JP | H02-114304 A | 4/1990 |
| JP | 2007179388 A | 7/2007 |
| JP | 2012-221291 A | 11/2012 |
| JP | 2015-140181 A | 8/2015 |
| JP | 2015-199439 A | 11/2015 |
| JP | 2015191273 A | 11/2015 |
| JP | 2016017914 A | 2/2016 |
| JP | 2016139163 A | 8/2016 |
| JP | 201781426 A | 5/2017 |
| JP | 2018-49445 A | 3/2018 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |
| WO | 2017/013746 A1 | 1/2017 |
| WO | 2017/013749 A1 | 1/2017 |
| WO | 2017/022448 A1 | 2/2017 |
| WO | 2017/120336 A2 | 7/2017 |
| WO | 2018147871 A1 | 8/2018 |
| WO | 2018147872 A1 | 8/2018 |
| WO | 2018147873 A1 | 8/2018 |
| WO | 2018147874 A1 | 8/2018 |

OTHER PUBLICATIONS

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.

Extended European Search Report of corresponding application EP 17895657.9; dated Feb. 25, 2020; 9 pages.

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.

Wray et al., Online Decision-Making for Scalable Autonomous Systems; Conference: Twenty-Sixth International Joint Conference on Artificial Intelligence; Conference Paper • Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.

Kala et al.; Motion Planning of Autonomous Vehicles on a Dual Carriageway without Speed Lanes; Electronics Jan. 13, 2015.

Matthews et al.; Intent Communication between Autonomous Vehicles and Pedestrians; 2015.

Ragi et al.; UAV path planning in a dynamic environment via partially observable Markov decision process; IEEE Transactions on Aerospace and Electronic Systems; Oct. 8, 2013.

Aoki, S. et al., A Merging Protocol for Self-Driving Vehicles, ICCPS, Apr. 2017.

International Application No. PCT/US2017/017493, filed Feb. 10, 2017.

International Application No. PCT/US2017/017502, filed Feb. 10, 2017.

International Application No. PCT/US2017/017516, filed Feb. 10, 2017.

International Application No. PCT/US2017/017527, filed Feb. 10, 2017.

U.S. Appl. No. 15/621,862, filed Jun. 13, 2017.

* cited by examiner

AUTONOMOUS VEHICLE OPERATIONAL MANAGEMENT INCLUDING OPERATING A PARTIALLY OBSERVABLE MARKOV DECISION PROCESS MODEL INSTANCE

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for autonomous vehicle operational management including operating a Partially Observable Markov Decision Process model instance may be advantageous.

SUMMARY

Disclosed herein are aspects, features, elements, implementations, and embodiments of autonomous vehicle operational management including operating a Partially Observable Markov Decision Process model instance.

An aspect of the disclosed embodiments is a method for use in traversing a vehicle transportation network, which may include traversing, by an autonomous vehicle, a vehicle transportation network, wherein traversing the vehicle transportation network includes operating a scenario-specific operational control evaluation module instance, wherein the scenario-specific operational control evaluation module instance is an instance of a scenario-specific operational control evaluation module, wherein the scenario-specific operational control evaluation module implements a partially observable Markov decision process, receiving a candidate vehicle control action from the scenario-specific operational control evaluation module instance, and traversing a portion of the vehicle transportation network based on the candidate vehicle control action.

Another aspect of the disclosed embodiments is a method for use in traversing a vehicle transportation network, which may include traversing, by an autonomous vehicle, a vehicle transportation network, wherein traversing the vehicle transportation network includes instantiating a scenario-specific operational control evaluation module instance that is an instance of a scenario-specific operational control evaluation module that implements a partially observable Markov decision process modeling a distinct vehicle operational control scenario. Modeling the distinct vehicle operational control scenario may include identifying a plurality of states corresponding to the distinct vehicle operational control scenario, identifying a plurality of available vehicle control actions based on the distinct vehicle operational control scenario, identifying a plurality of conditional transition probabilities, wherein each conditional transition probability from the plurality of conditional transition probabilities represents a probability of transitioning from a first respective state from the plurality of states to a second respective state from the plurality of states, identifying a reward function, wherein the reward function generates a reward corresponding to transitioning from a first respective state from the plurality of states to a second respective state from the plurality of states, identifying a plurality of observations, each observation from the plurality of observations corresponding to a respective state from the plurality of states, and identifying a plurality of conditional observation probabilities, wherein each conditional observation probability from the plurality of conditional observation probabilities indicates a probability of accuracy for a respective observation from the plurality of observations. Traversing the vehicle transportation network may include receiving a candidate vehicle control action from the scenario-specific operational control evaluation module instance, and traversing a portion of the vehicle transportation network based on the candidate vehicle control action.

Another aspect of the disclosed embodiments is an autonomous vehicle for autonomous vehicle operational management including operating a Partially Observable Markov Decision Process model instance. The autonomous vehicle may include a processor configured to execute instructions stored on a non-transitory computer readable medium to operate a scenario-specific operational control evaluation module instance, wherein the scenario-specific operational control evaluation module instance is an instance of a scenario-specific operational control evaluation module, wherein the scenario-specific operational control evaluation module implements a partially observable Markov decision process, receive a candidate vehicle control action from the scenario-specific operational control evaluation module instance, and control the autonomous vehicle to traverse a portion of the vehicle transportation network based on the candidate vehicle control action.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
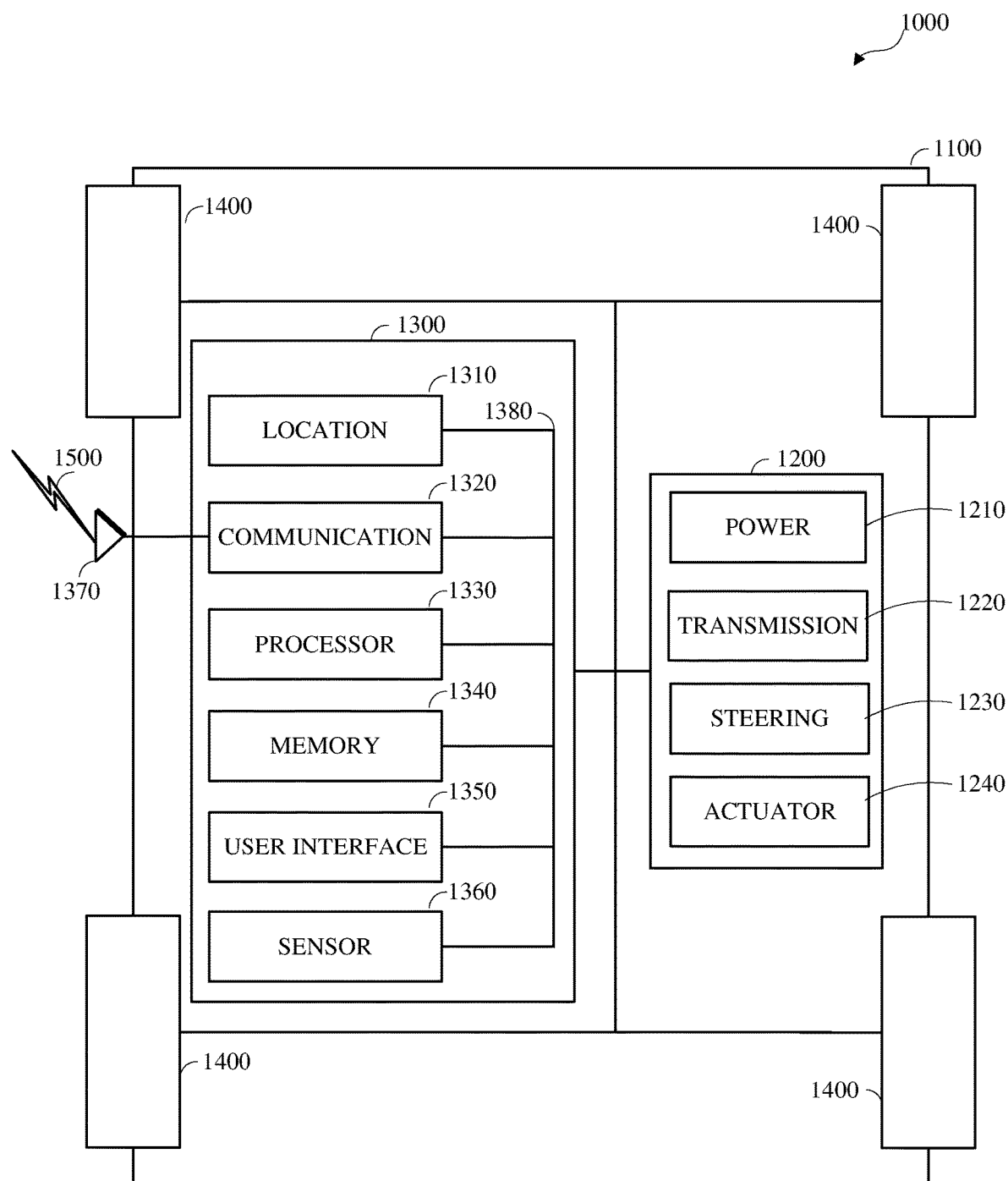
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller, or executor, which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module instances, may identify a vehicle control action from the candidate vehicle control actions, and may control the autonomous vehicle to traverse a portion of the vehicle transportation network according to the identified vehicle control action.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine -Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. In some embodiments, the user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

In some embodiments, the vehicle 1000 may be an autonomous vehicle. An autonomous vehicle may be controlled autonomously, without direct human intervention, to traverse a portion of a vehicle transportation network. Although not shown separately in FIG. 1, in some implementations, an autonomous vehicle may include an autonomous vehicle control unit, which may perform autonomous vehicle routing, navigation, and control. In some implementations, the autonomous vehicle control unit may be integrated with another unit of the vehicle. For example, the controller 1300 may include the autonomous vehicle control unit.

In some implementations, the autonomous vehicle control unit may control or operate the vehicle 1000 to traverse a portion of the vehicle transportation network in accordance with current vehicle operation parameters. In another example, the autonomous vehicle control unit may control or operate the vehicle 1000 to perform a defined operation or maneuver, such as parking the vehicle. In another example, autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to a trajectory controller that may operate the vehicle 1000 to travel from the origin to the destination using the generated route.

Figure 2:
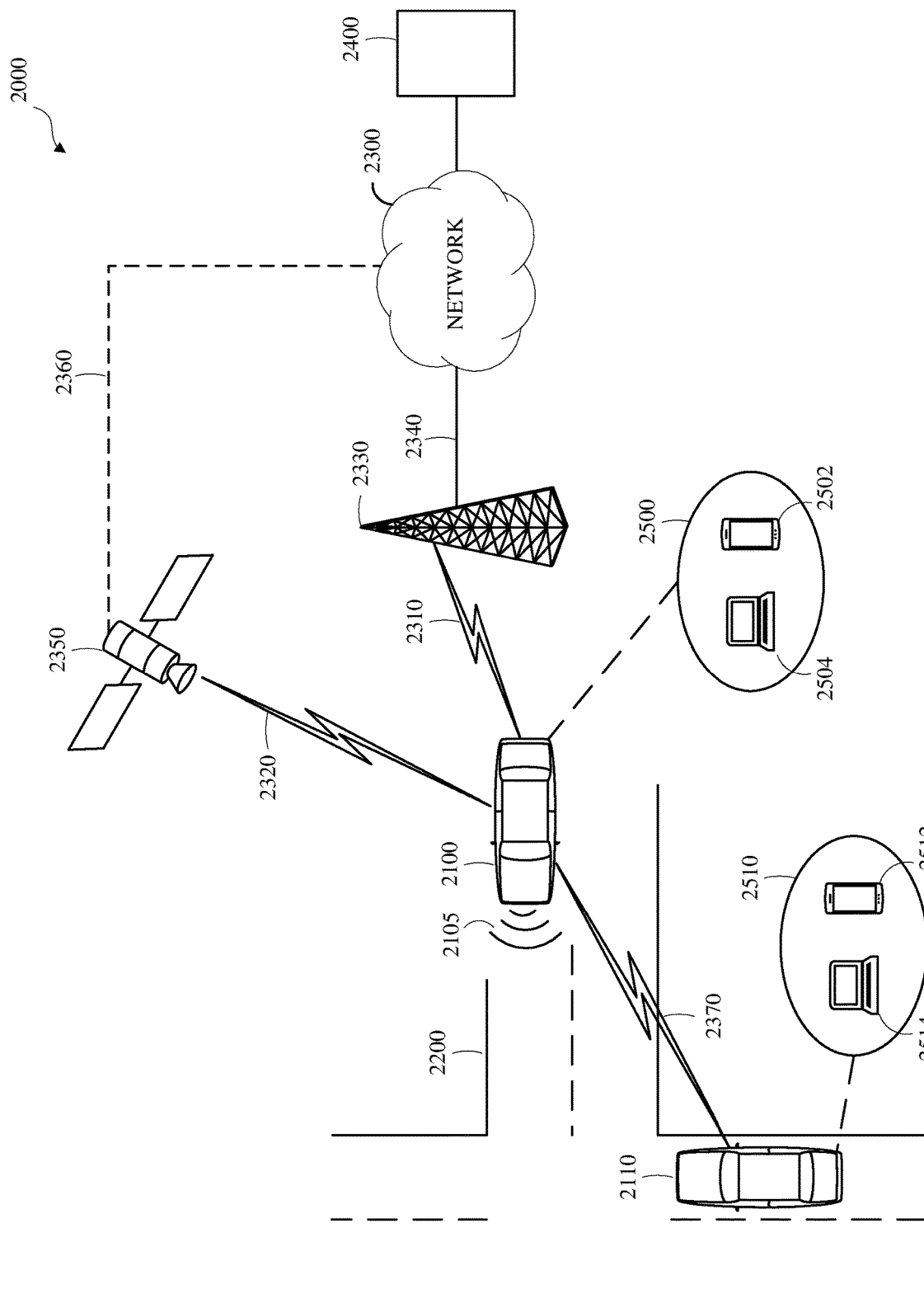
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
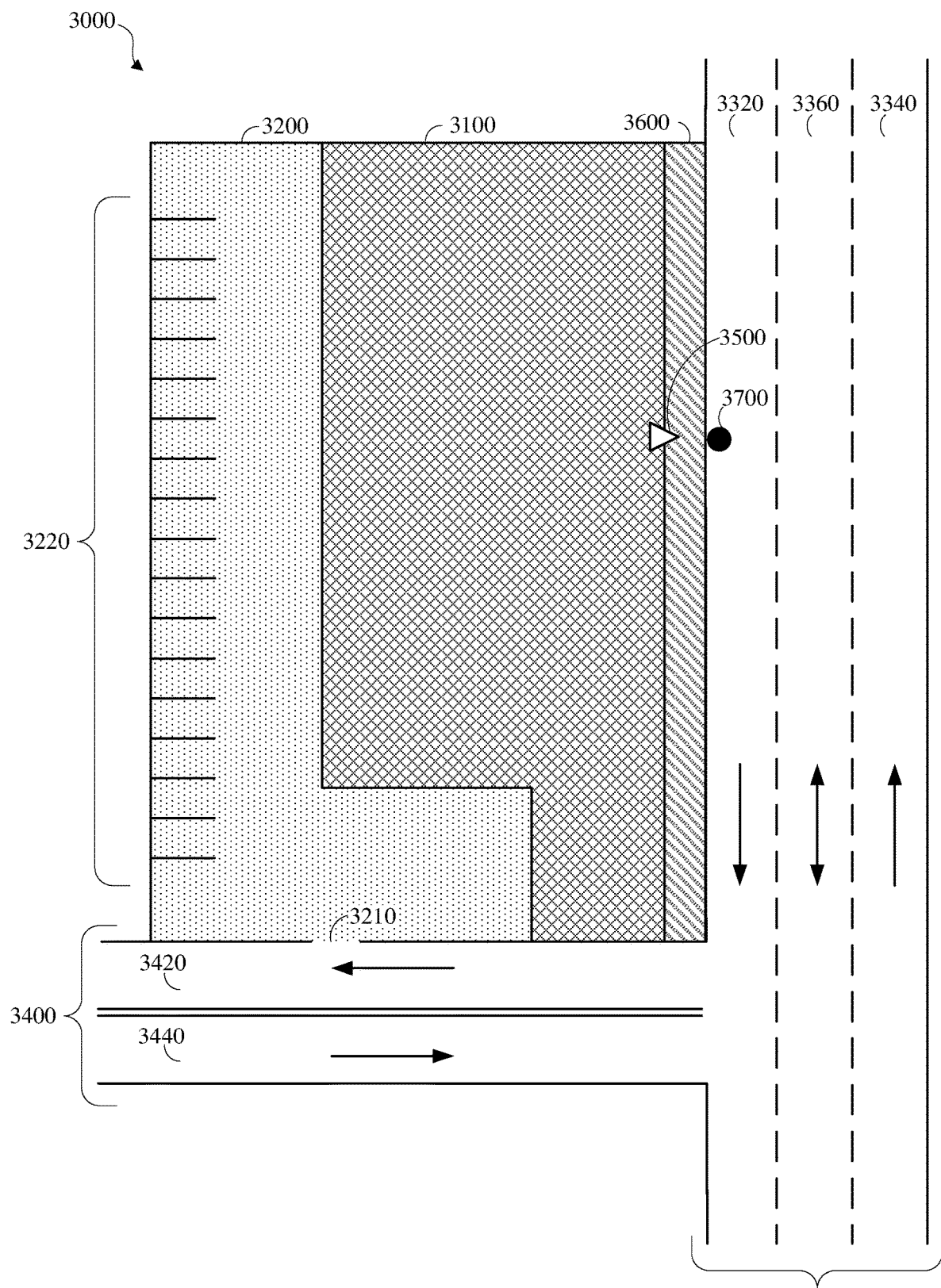
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400, may include one or more lanes 3320/3340/3360/3420/3440 and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information or a combination thereof.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, an autonomous vehicle may identify the point of interest as a destination, and the autonomous vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

In some embodiments, identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

In some embodiments, a destination may be associated with one or more entrances, such as the entrance 3500 shown in FIG. 3. In some embodiments, the vehicle transportation network information may include defined entrance location information, such as information identifying a geolocation of an entrance associated with a destination. In some embodiments, predicted entrance location information may be determined as described herein.

In some embodiments, the vehicle transportation network may be associated with, or may include, a pedestrian transportation network. For example, FIG. 3 includes a portion 3600 of a pedestrian transportation network, which may be a pedestrian walkway. In some embodiments, a pedestrian transportation network, or a portion thereof, such as the portion 3600 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

In some embodiments, a destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

In some embodiments, the vehicle transportation network information may include docking location information, such as information identifying a geolocation of one or more docking locations 3700 associated with a destination. In some embodiments, the docking location information may be defined docking location information, which may be docking location information manually included in the vehicle transportation network information. For example, defined docking location information may be included in the vehicle transportation network information based on user input. In some embodiments, the docking location information may be automatically generated docking location information as described herein. Although not shown separately in FIG. 3, docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

In an example, an autonomous vehicle may identify a point of interest, which may include the unnavigable area 3100, the parking area 3200, and the entrance 3500, as a destination. The autonomous vehicle may identify the unnavigable area 3100, or the entrance 3500, as a primary destination for the point of interest, and may identify the parking area 3200 as a secondary destination. The autonomous vehicle may identify the docking location 3700 as a docking location for the primary destination. The autonomous vehicle may generate a route from an origin (not shown) to the docking location 3700. The autonomous vehicle may traverse the vehicle transportation network from the origin to the docking location 3700 using the route. The autonomous vehicle may stop or park at the docking location 3700 such that passenger loading or unloading may be performed. The autonomous vehicle may generate a subsequent route from the docking location 3700 to the parking area 3200, may traverse the vehicle transportation network from the docking location 3700 to the parking area 3200 using the subsequent route, and may park in the parking area 3200.

Figure 4:
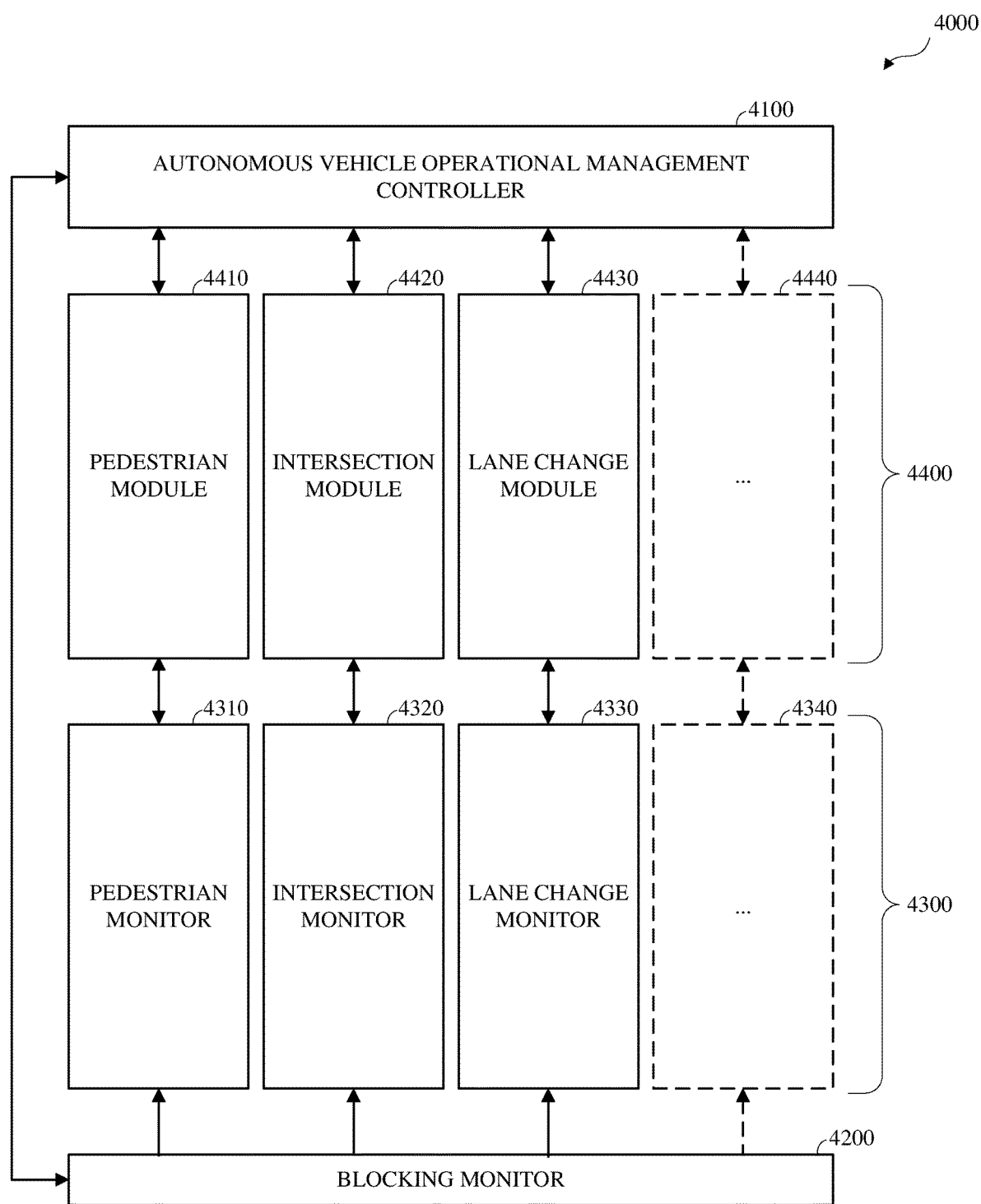
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios including a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes.

For simplicity and clarity, similar vehicle operational scenarios may be described herein with reference to vehicle operational scenario types or classes. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

In some embodiments, an autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

In some embodiments, controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action.

For example, the autonomous vehicle operational management controller 4100 may control the autonomous vehicle to traverse the vehicle transportation network, or a portion thereof, in accordance with a 'stop' vehicle control action by stopping the autonomous vehicle or otherwise controlling the autonomous vehicle to become or remain stationary.

In another example, the autonomous vehicle operational management controller 4100 may control the autonomous vehicle to traverse the vehicle transportation network, or a portion thereof, in accordance with an 'advance' vehicle control action by slowly inching forward a short distance, such as a few inches or a foot.

In another example, the autonomous vehicle operational management controller 4100 may control the autonomous vehicle to traverse the vehicle transportation network, or a portion thereof, in accordance with an 'accelerate' vehicle control action by accelerating a defined acceleration rate, or at an acceleration rate within a defined range.

In another example, the autonomous vehicle operational management controller 4100 may control the autonomous vehicle to traverse the vehicle transportation network, or a portion thereof, in accordance with a 'decelerate' vehicle control action by decelerating a defined deceleration rate, or at a deceleration rate within a defined range.

In another example, the autonomous vehicle operational management controller 4100 may control the autonomous vehicle to traverse the vehicle transportation network, or a portion thereof, in accordance with a 'maintain' vehicle control action by controlling the autonomous vehicle to traverse the vehicle transportation network, or a portion thereof, in accordance with current operational parameters, such as by maintaining a current velocity, maintaining a current path or route, maintaining a current lane orientation, or the like.

In another example, the autonomous vehicle operational management controller 4100 may control the autonomous vehicle to traverse the vehicle transportation network, or a portion thereof, in accordance with a 'proceed' vehicle control action by controlling the autonomous vehicle to traverse the vehicle transportation network, or a portion thereof, by beginning or resuming a previously identified set of operational parameters, which may include controlling the autonomous vehicle to traverse the vehicle transportation network, or a portion thereof, in accordance with one or more other vehicle control actions. For example, the autonomous vehicle may be stationary at an intersection, an identified route for the autonomous vehicle may include traversing through the intersection, and controlling the autonomous vehicle in accordance with a 'proceed' vehicle control action may include controlling the autonomous vehicle to accelerate at a defined acceleration rate to a defined velocity along the identified path. In another example, the autonomous vehicle may be traversing a portion of the vehicle transportation network at a defined velocity, a lane change may be identified for the autonomous vehicle, and controlling the autonomous vehicle in accordance with a 'proceed' vehicle control action may include controlling the autonomous vehicle to perform a sequence of trajectory adjustments in accordance with defined lane change parameters such that the autonomous vehicle performs the identified lane change operation.

In some embodiments, a vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

In some embodiments, a vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some embodiments, the autonomous vehicle operational management system 4000 may include an autonomous vehicle operational management controller 4100, a blocking monitor 4200, operational environment monitors 4300, scenario-specific operation control evaluation modules 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle.

For example, the operational environment information may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle.

In another example, the operational environment information may include information representing the vehicle transportation network proximate to the autonomous vehicle, such as within a defined spatial distance of the autonomous vehicle, such as 300 meters, information indicating the geometry of one or more aspects of the vehicle transportation network, information indicating a condition, such as a surface condition, of the vehicle transportation network, or any combination thereof.

In another example, the operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

In some embodiments, the autonomous vehicle operational management controller 4100 may monitor the operational environment of the autonomous vehicle, or defined aspects thereof. In some embodiments, monitoring the operational environment of the autonomous vehicle may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

In some embodiments, the operational environment monitors 4300 may include an operational environment monitor 4310 for monitoring pedestrians (pedestrian monitor), an operational environment monitor 4320 for monitoring intersections (intersection monitor), an operational environment monitor 4330 for monitoring lane changes (lane change monitor), or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian monitor 4310 may monitor operational environment information corresponding to multiple pedestrian vehicle operational scenarios, the intersection monitor 4320 may monitor operational environment information corresponding to multiple intersection vehicle operational scenarios, and the lane change monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the operational environment monitor 4310 for monitoring pedestrians may receive, or otherwise access, information, such as sensor information, which may indicate, correspond to, or may otherwise be associated with, one or more pedestrians in the operational environment of the autonomous vehicle.

In some embodiments, an operational environment monitor 4300 may associate the operational environment information, or a portion thereof, with the operational environment, or an aspect thereof, such as with an external object, such as a pedestrian, a remote vehicle, or an aspect of the vehicle transportation network geometry.

In some embodiments, an operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

In some embodiments, an operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. In some embodiments, an operational environment monitor 4300 may output the information representing the one or more aspects of the operational environment to one or more elements of the autonomous vehicle operational management system 4000, such as the blocking monitor 4200.

For example, the operational environment monitor 4310 for monitoring pedestrians may correlate, associate, or otherwise process the operational environment information to identify, track, or predict actions of one or more pedestrians. For example, the operational environment monitor 4310 for monitoring pedestrians may receive information, such as sensor information, from one or more sensors, which may correspond to one or more pedestrians, the operational environment monitor 4310 for monitoring pedestrians may associate the sensor information with one or more identified pedestrians, which may include may identifying a direction of travel, a path, such as an expected path, a current or expected velocity, a current or expected acceleration rate, or a combination thereof for one or more of the respective identified pedestrians, and the operational environment monitor 4310 for monitoring pedestrians may output the identified, associated, or generated pedestrian information to, or for access by, the autonomous vehicle operational management controller 4100.

In another example, the operational environment monitor 4320 for monitoring intersections may correlate, associate, or otherwise process the operational environment information to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the operational environment monitor 4310 for monitoring intersections may receive information, such as sensor information, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the operational environment monitor 4310 for monitoring intersections may associate the sensor information with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and the operational environment monitor 4320 for monitoring intersections may output the identified, associated, or generated intersection information to, or for access by, the autonomous vehicle operational management controller 4100.

In another example, operational environment monitor 4330 for monitoring lane changing may correlate, associate, or otherwise process the operational environment information to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a current or expected lane change operation. For example, the operational environment monitor 4330 for monitoring lane changing may receive information, such as sensor information, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a current or expected lane change operation, the operational environment monitor 4330 for monitoring lane changing may associate the sensor information with one or more identified remote vehicles in the operational environment of the autonomous vehicle, one or more aspects of the operational environment of the autonomous vehicle or a combination thereof geospatially corresponding to a current or expected lane change operation, which may include may identifying a current or expected direction of travel, a path, such as an expected path, a current or expected velocity, a current or expected acceleration rate, or a combination thereof for one or more of the respective identified remote vehicles, and the operational environment monitor 4330 for monitoring intersections may output the identified, associated, or generated lane change information to, or for access by, the autonomous vehicle operational management controller 4100.

The autonomous vehicle operational management controller 4100 may identify one or more distinct vehicle operational scenarios based on one or more aspects of the operational environment represented by the operational environment information. For example, the autonomous vehicle operational management controller 4100 may identify a distinct vehicle operational scenario in response to identifying, or based on, the operational environment information indicated by one or more of the operational environment monitors 4300.

In some embodiments, the autonomous vehicle operational management controller 4100 may identify multiple distinct vehicle operational scenarios based on one or more aspects of the operational environment represented by the operational environment information. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the scenario-specific operational control evaluation modules 4400 based on one or more aspects of the operational environment represented by the operational environment information. For example, the autonomous vehicle operational management controller 4100 may instantiate the instance of the scenario-specific operational control evaluation module 4400 in response to identifying the distinct vehicle operational scenario.

In some embodiments, the autonomous vehicle operational management controller 4100 may instantiate multiple instances of one or more scenario-specific operational control evaluation modules 4400 based on one or more aspects of the operational environment represented by the operational environment information. For example, the operational environment information may indicate two pedestrians in the operational environment of the autonomous vehicle and the autonomous vehicle operational management controller 4100 may instantiate a respective instance of the pedestrian-scenario-specific operational control evaluation module 4410 for each pedestrian based on one or more aspects of the operational environment represented by the operational environment information.

In some embodiments, the cardinality, number, or count, of identified external objects, such as pedestrians or remote vehicles, corresponding to a scenario, such as the pedestrian scenario, the intersection scenario, or the lane change scenario, may exceed a defined threshold, which may be a defined scenario-specific threshold, and the autonomous vehicle operational management controller 4100 may omit instantiating an instance of a scenario-specific operational control evaluation module 4400 corresponding to one or more of the identified external objects.

For example, the operational environment information indicated by the operational environment monitors 4300 may indicate twenty-five pedestrians in the operational environment of the autonomous vehicle, the defined threshold for the pedestrian scenario may be a defined cardinality, such as ten, of pedestrians, the autonomous vehicle operational management controller 4100 may identify the ten most relevant pedestrians, such as the ten pedestrians geospatially most proximate to the autonomous vehicle having converging expected paths with the autonomous vehicle, the autonomous vehicle operational management controller 4100 may instantiate ten instances of the pedestrian-scenario-specific operational control evaluation module 4410 for the ten most relevant pedestrians, and the autonomous vehicle operational management controller 4100 may omit instantiating instances of the pedestrian-scenario-specific operational control evaluation module 4410 for the fifteen other pedestrians.

In another example, the operational environment information indicated by the operational environment monitors 4300 may indicate an intersection including four road segments, such as a northbound road segment, a southbound road segment, an eastbound road segment, and a westbound road segment, and indicating five remote vehicles corresponding to the northbound road segment, three remote vehicles corresponding to the southbound road segment, four remote vehicles corresponding to the eastbound road segment, and two remote vehicles corresponding to the westbound road segment, the defined threshold for the intersection scenario may be a defined cardinality, such as two, of remote vehicles per road segment, the autonomous vehicle operational management controller 4100 may identify the two most relevant remote vehicles per road segment, such as the two remote vehicles geospatially most proximate to the intersection having converging expected paths with the autonomous vehicle per road segment, the autonomous vehicle operational management controller 4100 may instantiate two instances of the intersection-scenario-specific operational control evaluation module 4420 for the two most relevant remote vehicles corresponding to the northbound road segment, two instances of the intersection-scenario-specific operational control evaluation module 4420 for the two most relevant remote vehicles corresponding to the southbound road segment, two instances of the intersection-scenario-specific operational control evaluation module 4420 for the two most relevant remote vehicles corresponding to the eastbound road segment, and two instances of the intersection-scenario-specific operational control evaluation module 4420 for the two remote vehicles corresponding to the westbound road segment, and the autonomous vehicle operational management controller 4100 may omit instantiating instances of the intersection-scenario-specific operational control evaluation module 4420 for the three other remote vehicles corresponding to the northbound road segment, the other remote vehicle corresponding to the southbound road segment, and the two other remote vehicles corresponding to the eastbound road segment. Alternatively, or in addition, the defined threshold for the intersection scenario may be a defined cardinality, such as eight, remote vehicles per intersection, and the autonomous vehicle operational management controller 4100 may identify the eight most relevant remote vehicles for the intersection, such as the eight remote vehicles geospatially most proximate to the intersection having converging expected paths with the autonomous vehicle, the autonomous vehicle operational management controller 4100 may instantiate eight instances of the intersection-scenario-specific operational control evaluation module 4420 for the eight most relevant remote vehicles, and the autonomous vehicle operational management controller 4100 may omit instantiating instances of the intersection-scenario-specific operational control evaluation module 4420 for the six other remote vehicles.

In some embodiments, the autonomous vehicle operational management controller 4100 may send the operational environment information, or one or more aspects thereof, to another unit of the autonomous vehicle, such as the blocking monitor 4200 or one or more instances of the scenario-specific operational control evaluation modules 4400.

In some embodiments, the autonomous vehicle operational management controller 4100 may store the operational environment information, or one or more aspects thereof, such as in a memory, such as the memory 1340 shown in FIG. 1, of the autonomous vehicle.

The autonomous vehicle operational management controller 4100 may receive candidate vehicle control actions from respective instances of the scenario-specific operational control evaluation modules 4400. For example, a candidate vehicle control action from a first instance of a first scenario-specific operational control evaluation module 4400 may indicate a 'stop' vehicle control action, a candidate vehicle control action from a second instance of a second scenario-specific operational control evaluation module 4400 may indicate an 'advance' vehicle control action, and a candidate vehicle control action from a third instance of a third scenario-specific operational control evaluation module 4400 may indicate a 'proceed' vehicle control action.

The autonomous vehicle operational management controller 4100 may determine whether to traverse a portion of the vehicle transportation network in accordance with one or more candidate vehicle control actions. For example, the autonomous vehicle operational management controller 4100 may receive multiple candidate vehicle control actions from multiple instances of scenario-specific operational control evaluation modules 4400, may identify a vehicle control action from the candidate vehicle control actions, and may traverse the vehicle transportation network in accordance with the vehicle control action.

In some embodiments, the autonomous vehicle operational management controller 4100 may identify a vehicle control action from the candidate vehicle control actions based on one or more defined vehicle control action identification metrics.

In some embodiments, the defined vehicle control action identification metrics may include a priority, weight, or rank, associated with each type of vehicle control action, and identifying the vehicle control action from the candidate vehicle control actions may include identifying a highest priority vehicle control action from the candidate vehicle control actions. For example, the 'stop' vehicle control action may be associated with a high priority, the 'advance' vehicle control action may be associated with an intermediate priority, which may be lower than the high priority, and the 'proceed' vehicle control action may be associated with a low priority, which may be lower than the intermediate priority. In an example, the candidate vehicle control actions may include one or more 'stop' vehicle control actions, and the 'stop' vehicle control action may be identified as the vehicle control action. In another example, the candidate vehicle control actions may omit a 'stop' vehicle control action, may include one or more 'advance' vehicle control actions, and the 'advance' vehicle control action may be identified as the vehicle control action. In another example, the candidate vehicle control actions may omit a 'stop' vehicle control action, may omit an 'advance' vehicle control action, may include one or more 'proceed' vehicle control actions, and the 'proceed' vehicle control action may be identified as the vehicle control action.

In some embodiments, identifying the vehicle control action from the candidate vehicle control actions may include generating or calculating a weighted average for each type of vehicle control action based on the defined vehicle control action identification metrics, the instantiated scenarios, weights associated with the instantiated scenarios, the candidate vehicle control actions, weights associated with the candidate vehicle control actions, or a combination thereof.

For example, identifying the vehicle control action from the candidate vehicle control actions may include implementing a machine learning component, such as supervised learning of a classification problem, and training the machine learning component using examples, such as 1000 examples, of the corresponding vehicle operational scenario. In another example, identifying the vehicle control action from the candidate vehicle control actions may include implementing a Markov Decision Process, or a Partially Observable Markov Decision Processes, which may describe how respective candidate vehicle control actions affect subsequent candidate vehicle control actions affect, and may include a reward function that outputs a positive or negative reward for respective vehicle control actions.

The autonomous vehicle operational management controller 4100 may uninstantiate an instance of a scenario-specific operational control evaluation module 4400. For example, the autonomous vehicle operational management controller 4100 may identify a distinct set of operative conditions as indicating a distinct vehicle operational scenario for the autonomous vehicle, instantiate an instance of a scenario-specific operational control evaluation module 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the scenario-specific operational control evaluation module 4400.

The blocking monitor 4200 may receive operational environment information representing an operational environment, or an aspect thereof, for the autonomous vehicle. For example, the blocking monitor 4200 may receive the operational environment information from the autonomous vehicle operational management controller 4100, from a sensor of the autonomous vehicle, from an external device, such as a remote vehicle or an infrastructure device, or a combination thereof. In some embodiments, the blocking monitor 4200 may read the operational environment information, or a portion thereof, from a memory, such as a memory of the autonomous vehicle, such as the memory 1340 shown in FIG. 1.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

The blocking monitor 4200 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle.

A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network.

The blocking monitor 4200 may identify a respective probability of availability for each of multiple portions of the vehicle transportation network within an operational environment, such as within 300 meters, of the autonomous vehicle.

In some embodiments, the blocking monitor 4200 may identify a portion of the vehicle transportation network and a corresponding probability of availability based on operating information for the autonomous vehicle, operating information for one or more external objects, vehicle transportation network information representing the vehicle transportation network, or a combination thereof. In some embodiments, the operating information for the autonomous vehicle may include information indicating a geospatial location of the autonomous vehicle in the vehicle transportation network, which may be a current location or an expected location, such as an expected location identified based on an expected path for the autonomous vehicle. In some embodiments, the operating information for the external objects may indicate a respective geospatial location of one or more external objects in, or proximate to, the vehicle transportation network, which may be a current location or an expected location, such as an expected location identified based on an expected path for the respective external object.

In some embodiments, a probability of availability may be indicated by the blocking monitor 4200 corresponding to each external object in the operational environment of the autonomous vehicle and a geospatial area may be associated with multiple probabilities of availability corresponding to multiple external objects. In some embodiments, an aggregate probability of availability may be indicated by the blocking monitor 4200 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types. In some embodiments, the blocking monitor 4200 may indicate one aggregate probability of availability for each geospatial location, which may include multiple temporal probabilities of availability for a geographical location.

In some embodiments, the blocking monitor 4200 may identify external objects, track external objects, project location information, path information, or both for external objects, or a combination thereof. For example, the blocking monitor 4200 may identify an external object and may identify an expected path for the external object, which may indicate a sequence of expected spatial locations, expected temporal locations, and corresponding probabilities.

In some embodiments, the blocking monitor may identify the expected path for an external object based on operational environment information, such as information indicating a current location of the external object, information indicating a current trajectory for the external object, information indicating a type of classification of the external object, such as information classifying the external object as a pedestrian or a remote vehicle, vehicle transportation network information, such as information indicating that the vehicle transportation network includes a crosswalk proximate to the external object, previously identified or tracked information associated with the external object, or any combination thereof. For example, the external object may be identified as a remote vehicle, and the expected path for the remote vehicle may be identified based on information indicating a current location of the remote vehicle, information indicating a current trajectory of the remote vehicle, information indicating a current speed of the remote vehicle, vehicle transportation network information corresponding to the remote vehicle, legal or regulatory information, or a combination thereof.

In some embodiments, the blocking monitor 4200 may determine, or update, probabilities of availability continually or periodically. In some embodiments, one or more classes or types of external object may be identified as preferentially blocking, and the expected path of a preferentially blocking external object may overlap, spatially and temporally, the expected path of another preferentially blocking external object. For example, the expected path of a pedestrian may overlap with the expected path of another pedestrian. In some embodiments, one or more classes or types of external object may be identified as deferentially blocking, and the expected path of a deferentially blocking external object may be blocked, such as impeded or otherwise affected, by other external objects. For example, the expected path for a remote vehicle may be blocked by another remote vehicle or by a pedestrian.

In some embodiments, the blocking monitor 4200 may identify expected paths for preferentially blocking external objects, such as pedestrians, and may identify expected paths for deferentially blocking external objects, such as remote vehicles, subject to the expected paths for the preferentially blocking external objects. In some embodiments, the blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Each scenario-specific operational control evaluation module 4400 may model a respective distinct vehicle operational scenario. The autonomous vehicle operational management system 4000 may include any number of scenario-specific operational control evaluation modules 4400, each modeling a respective distinct vehicle operational scenario.

In some embodiments, modeling a distinct vehicle operational scenario, by a scenario-specific operational control evaluation module 4400, may include generating, maintaining, or both state information representing aspects of an operational environment of the autonomous vehicle corresponding to the distinct vehicle operational scenario, identifying potential interactions among the modeled aspects respective of the corresponding states, and determining a candidate vehicle control action that solves the model. In some embodiments, aspects of the operational environment of the autonomous vehicle other than the defined set of aspects of the operational environment of the autonomous vehicle corresponding to the distinct vehicle operational scenario may be omitted from the model.

The autonomous vehicle operational management system 4000 may be solution independent and may include any model of a distinct vehicle operational scenario, such as a single-agent model, a multi-agent model, a learning model, or any other model of one or more distinct vehicle operational scenarios.

One or more of the scenario-specific operational control evaluation modules 4400 may be a Classical Planning (CP) model, which may be a single-agent model, and which may model a distinct vehicle operational scenario based on a defined input state, which may indicate respective non-probabilistic states of the elements of the operational environment of the autonomous vehicle for the distinct vehicle operational scenario modeled by the scenario-specific operational control evaluation modules 4400. In a Classical Planning model, one or more aspects, such as geospatial location, of modeled elements, such as external objects, associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

One or more of the scenario-specific operational control evaluation modules 4400 may be a discrete time stochastic control process, such as a Markov Decision Process (MDP) model, which may be a single-agent model, and which may model a distinct vehicle operational scenario based on a defined input state. Changes to the operational environment of the autonomous vehicle, such as a change of location for an external object, may be modeled as probabilistic changes. A Markov Decision Process model may utilize more processing resources and may more accurately model the distinct vehicle operational scenario than a Classical Planning (CP) model.

A Markov Decision Process model may model a distinct vehicle operational scenario as a sequence of temporal locations, such as a current temporal location, future temporal locations, or both, with corresponding states, such as a current state, expected future states, or both. At each temporal location the model may have a state, which may be an expected state, and which may be associated with one or more candidate vehicle control actions. The model may represent the autonomous vehicle as an agent, which may transition, along the sequence of temporal locations, from one state (a current state) to another state (subsequent state) in accordance with an identified action for the current state and a probability that the identified action will transition the state from the current state to the subsequent state.

The model may accrue a reward, which may be a positive or negative value, corresponding to transitioning from the one state to another according to a respective action. The model may solve the distinct vehicle operational scenario by identifying the actions corresponding to each state in the sequence of temporal locations that maximizes the cumulative reward. Solving a model may include identifying a vehicle control action in response to the modeled scenario and the operational environment information.

A Markov Decision Process model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the Markov Decision Process model, one or more possible subsequent states of the Markov Decision Process model, or a combination thereof. A state may represent an identified condition, which may be an expected condition, of respective defined aspects, such as external objects and traffic control devices, of the operational environment of the autonomous vehicle that may probabilistically affect the operation of the autonomous vehicle at a discrete temporal location. For example, a remote vehicle operating in the proximity of the autonomous vehicle may affect the operation of the autonomous vehicle and may be represented in a Markov Decision Process model, which may include representing an identified or expected geospatial location of the remote vehicle, an identified or expected path, heading, or both of the remote vehicle, an identified or expected velocity of the remote vehicle, an identified or expected acceleration or deceleration rate of the remote vehicle, or a combination thereof corresponding to the respected temporal location. At instantiation, the current state of the Markov Decision Process model may correspond to a contemporaneous state or condition of the operating environment. A respective set of states may be defined for each distinct vehicle operational scenario.

Although any number or cardinality of states may be used, the number or cardinality of states included in a model may be limited to a defined maximum number of states, such as 300 states. For example, a model may include the 300 most probable states for a corresponding scenario.

The set of actions may include vehicle control actions available to the Markov Decision Process model at each state in the set of states. A respective set of actions may be defined for each distinct vehicle operational scenario.

The set of state transition probabilities may probabilistically represent potential or expected changes to the operational environment of the autonomous vehicle, as represented by the states, responsive to the actions. For example, a state transition probability may indicate a probability that the operational environment of the autonomous vehicle corresponds to a respective state at a respective temporal location immediately subsequent to a current temporal location corresponding to a current state in response to traversing the vehicle transportation network by the autonomous vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

Examples of state transition probabilities associated with a pedestrian vehicle operational scenario may include a defined probability of a pedestrian jaywalking, which may be based on a geospatial distance between the pedestrian and the respective road segment; a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with a an intersection vehicle operational scenario.

Examples of state transition probabilities associated with a lane change vehicle operational scenario may include a defined probability of a remote vehicle changing velocity, such as a defined probability of a remote vehicle behind the autonomous vehicle increasing velocity or a defined probability of a remote vehicle in front of the autonomous vehicle decreasing velocity; a defined probability of a remote vehicle in front of the autonomous vehicle changing lanes; a defined probability of a remote vehicle proximate to the autonomous vehicle changing speed to allow the autonomous vehicle to merge into a lane; or any other probabilities associated with a lane change vehicle operational scenario.

The reward function may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state.

The reward function may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

One or more of the scenario-specific operational control evaluation modules 4400 may be a Partially Observable Markov Decision Process (POMDP) model, which may be a single-agent model. A Partially Observable Markov Decision Process model may be similar to a Markov Decision Process model, except that a Partially Observable Markov Decision Process model may include modeling uncertain states. A Partially Observable Markov Decision Process model may include modeling confidence, sensor trustworthiness, distraction, noise, uncertainty, such as sensor uncertainty, or the like. A Partially Observable Markov Decision Process model may utilize more processing resources and may more accurately model the distinct vehicle operational scenario than a Markov Decision Process model.

A Partially Observable Markov Decision Process model may model a distinct vehicle operational scenario using a set of states, a set of states, a set of actions, a set of state transition probabilities, a reward function, a set of observations, a set of conditional observation probabilities, or a combination thereof. The set of states, the set of actions, the set of state transition probabilities, and the reward function may be similar to those described above with respect to the Markov Decision Process model.

The set of observations may include observations corresponding to respective states. An observation may provide information about the attributes of a respective state. An observation may correspond with a respective temporal location. An observation may include operational environment information, such as sensor information. An observation may include expected or predicted operational environment information.

For example, a Partially Observable Markov Decision Process model may include an autonomous vehicle at a first geospatial location and first temporal location corresponding to a first state, the model may indicate that the autonomous vehicle may identify and perform, or attempt to perform, a vehicle control action to traverse the vehicle transportation network from the first geospatial location to a second geospatial location at a second temporal location immediately subsequent to the first temporal location, and the set of observations corresponding to the second temporal location may include the operational environment information that may be identified corresponding to the second temporal location, such as geospatial location information for the autonomous vehicle, geospatial location information for one or more external objects, probabilities of availability, expected path information, or the like.

The set of conditional observation probabilities may include probabilities of making respective observations based on the operational environment of the autonomous vehicle. For example, an autonomous vehicle may approach an intersection by traversing a first road, contemporaneously, a remote vehicle may approach the intersection by traversing a second road, the autonomous vehicle may identify and evaluate operational environment information, such as sensor information, corresponding to the intersection, which may include operational environment information corresponding to the remote vehicle. In some embodiments, the operational environment information may be inaccurate, incomplete, or erroneous. In a Markov Decision Process model, the autonomous vehicle may non-probabilistically identify the remote vehicle, which may include identifying a location of the remote vehicle, an expected path for the remote vehicle, or the like, and the identified information, such as the identified location of the remote vehicle, based on inaccurate operational environment information, may be inaccurate or erroneous. In a Partially Observable Markov Decision Process model the autonomous vehicle may identify information probabilistically identifying the remote vehicle, which may include probabilistically identifying location information for the remote vehicle, such as location information indicating that the remote vehicle may be proximate to the intersection. The conditional observation probability corresponding to observing, or probabilistically identifying, the location of the remote vehicle may represent the probability that the identified operational environment information accurately represents the location of the remote vehicle.

The set of conditional observation probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

In some embodiments, such as embodiments implementing a Partially Observable Markov Decision Process model, modeling an autonomous vehicle operational control scenario may include modeling occlusions. For example, the operational environment information may include information corresponding to one or more occlusions, such as sensor occlusions, in the operational environment of the autonomous vehicle such that the operational environment information may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4300 may identify occlusions, may identify or determine a probability that an external object is occluded, or hidden, by an identified occlusion, and may include occluded vehicle probability information in the operational environment information output to the autonomous vehicle operational management controller 4100, and communicated, by the autonomous vehicle operational management controller 4100, to the respective scenario-specific operational control evaluation modules 4400.

In some embodiments, one or more of the scenario-specific operational control evaluation modules 4400 may be a Decentralized Partially Observable Markov Decision Process (Dec-POMDP) model, which may be a multi-agent model, and which may model a distinct vehicle operational scenario. A Decentralized Partially Observable Markov Decision Process model may be similar to a Partially Observable Markov Decision Process model except that a Partially Observable Markov Decision Process model may model the autonomous vehicle and a subset, such as one, of external objects and a Decentralized Partially Observable Markov Decision Process model may model the autonomous vehicle and the set of external objects.

In some embodiments, one or more of the scenario-specific operational control evaluation modules 4400 may be a Partially Observable Stochastic Game (POSG) model, which may be a multi-agent model, and which may model a distinct vehicle operational scenario. A Partially Observable Stochastic Game model may be similar to a Decentralized Partially Observable Markov Decision Process except that the Decentralized Partially Observable Markov Decision Process model may include a reward function for the autonomous vehicle and the Partially Observable Stochastic Game model may include the reward function for the autonomous vehicle and a respective reward function for each external object.

In some embodiments, one or more of the scenario-specific operational control evaluation modules 4400 may be a Reinforcement Learning (RL) model, which may be a learning model, and which may model a distinct vehicle operational scenario. A Reinforcement Learning model may be similar to a Markov Decision Process model or a Partially Observable Markov Decision Process model except that defined state transition probabilities, observation probabilities, reward function, or any combination thereof, may be omitted from the model.

In some embodiments, a Reinforcement Learning model may be a model-based Reinforcement Learning model, which may include generating state transition probabilities, observation probabilities, a reward function, or any combination thereof based on one or more modeled or observed events.

In a Reinforcement Learning model, the model may evaluate one or more events or interactions, which may be simulated events, such as traversing an intersection, traversing a vehicle transportation network near a pedestrian, or changing lanes, and may generate, or modify, a corresponding model, or a solution thereof, in response to the respective event. For example, the autonomous vehicle may traverse an intersection using a Reinforcement Learning model. The Reinforcement Learning model may indicate a candidate vehicle control action for traversing the intersection. The autonomous vehicle may traverse the intersection using the candidate vehicle control action as the vehicle control action for a temporal location. The autonomous vehicle may determine a result of traversing the intersection using the candidate vehicle control action, and may update the model based on the result.

In an example, at a first temporal location a remote vehicle may be stationary at an intersection with a prohibited right-of-way indication, such as a red light, the Reinforcement Learning model may indicate a 'proceed' candidate vehicle control action for the first temporal location, the Reinforcement Learning model may include a probability of identifying operational environment information at a subsequent temporal location, subsequent to traversing the vehicle transportation network in accordance with the identified candidate vehicle control action, indicating that a geospatial location of the remote vehicle corresponding to the first temporal location differs from a geospatial location of the remote vehicle corresponding to the second temporal location is low, such as 0/100. The autonomous vehicle may traverse the vehicle transportation network in accordance with the identified candidate vehicle control action, may subsequently determine that the geospatial location of the remote vehicle corresponding to the first temporal location differs from the geospatial location of the remote vehicle corresponding to the second temporal location, and may modify, or update, the probability accordingly incorporate the identified event, such as to 1/101.

In another example, the Reinforcement Learning model may indicate a defined positive expected reward for traversing the vehicle transportation network from a first temporal location to a second temporal location in accordance with an identified vehicle control action and in accordance with identified operational environment information, which may be probabilistic. The autonomous vehicle may traverse the vehicle transportation network in accordance with the identified vehicle control action. The autonomous vehicle may determine, based on subsequently identified operational environment information, which may be probabilistic, that the operational environment information corresponding to the second temporal location is substantially similar to the operational environment information identified corresponding to the first temporal location, which may indicate a cost, such as in time, of traversing the vehicle transportation network in accordance with the identified vehicle control action, and the Reinforcement Learning model may reduce the corresponding expected reward.

The autonomous vehicle operational management system 4000 may include any number or combination of types of models. For example, the pedestrian-scenario-specific operational control evaluation module 4410, the intersection-scenario-specific operational control evaluation module 4420, and the lane change-scenario-specific operational control evaluation module 4430 may be Partially Observable Markov Decision Process models. In another example, the pedestrian-scenario-specific operational control evaluation module 4410 may be a Markov Decision Process model and the intersection-scenario-specific operational control evaluation module 4420 and the lane change-scenario-specific operational control evaluation module 4430 may be Partially Observable Markov Decision Process models.

The autonomous vehicle operational management controller 4100 may instantiate any number of instances of the scenario-specific operational control evaluation modules 4400 based on the operational environment information.

For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both. The autonomous vehicle operational management controller 4100 may instantiate an instance of the pedestrian-scenario-specific operational control evaluation module 4410, an instance of the intersection-scenario-specific operation control evaluation module 4420, or both.

In another example, the operational environment information may include information representing more than one pedestrians at or near an intersection along an expected path for the autonomous vehicle. The autonomous vehicle operational management controller 4100 may identify pedestrian operational scenarios corresponding to the one or more pedestrians, an intersection vehicle operational scenario, or a combination thereof. The autonomous vehicle operational management controller 4100 may instantiate instances of the pedestrian-scenario-specific operational control evaluation module 4410 for some or all of the pedestrian operational scenarios, an instance of the intersection-scenario-specific operation control evaluation module 4420, or a combination thereof.

The pedestrian-scenario-specific operational control evaluation module 4410 may be a model of an autonomous vehicle operational control scenario that includes the autonomous vehicle traversing a portion of the vehicle transportation network proximate to a pedestrian (pedestrian scenario). The pedestrian-scenario-specific operation control evaluation module 4410 may receive operational environment information, such as the pedestrian information generated by the operational environment monitor 4310 for monitoring pedestrians, from the autonomous vehicle operational management controller 4100.

The pedestrian-scenario-specific operational control evaluation module 4410 may model pedestrian behavior corresponding to the pedestrian traversing a portion of the vehicle transportation network or otherwise probabilistically affecting the operation of the autonomous vehicle. In some embodiments, the pedestrian-scenario-specific operational control evaluation module 4410 may model a pedestrian as acting in accordance with pedestrian model rules expressing probable pedestrian behavior. For example, the pedestrian model rules may express vehicle transportation network regulations, pedestrian transportation network regulations, predicted pedestrian behavior, societal norms, or a combination thereof. For example, the pedestrian model rules may indicate a probability that a pedestrian may traverse a portion of the vehicle transportation network via a crosswalk or other defined pedestrian access area. In some embodiments, the pedestrian-scenario-specific operational control evaluation module 4410 may model a pedestrian as acting independently of defined vehicle transportation network regulations, pedestrian transportation network regulations, or both, such as by jaywalking.

Figure 7:
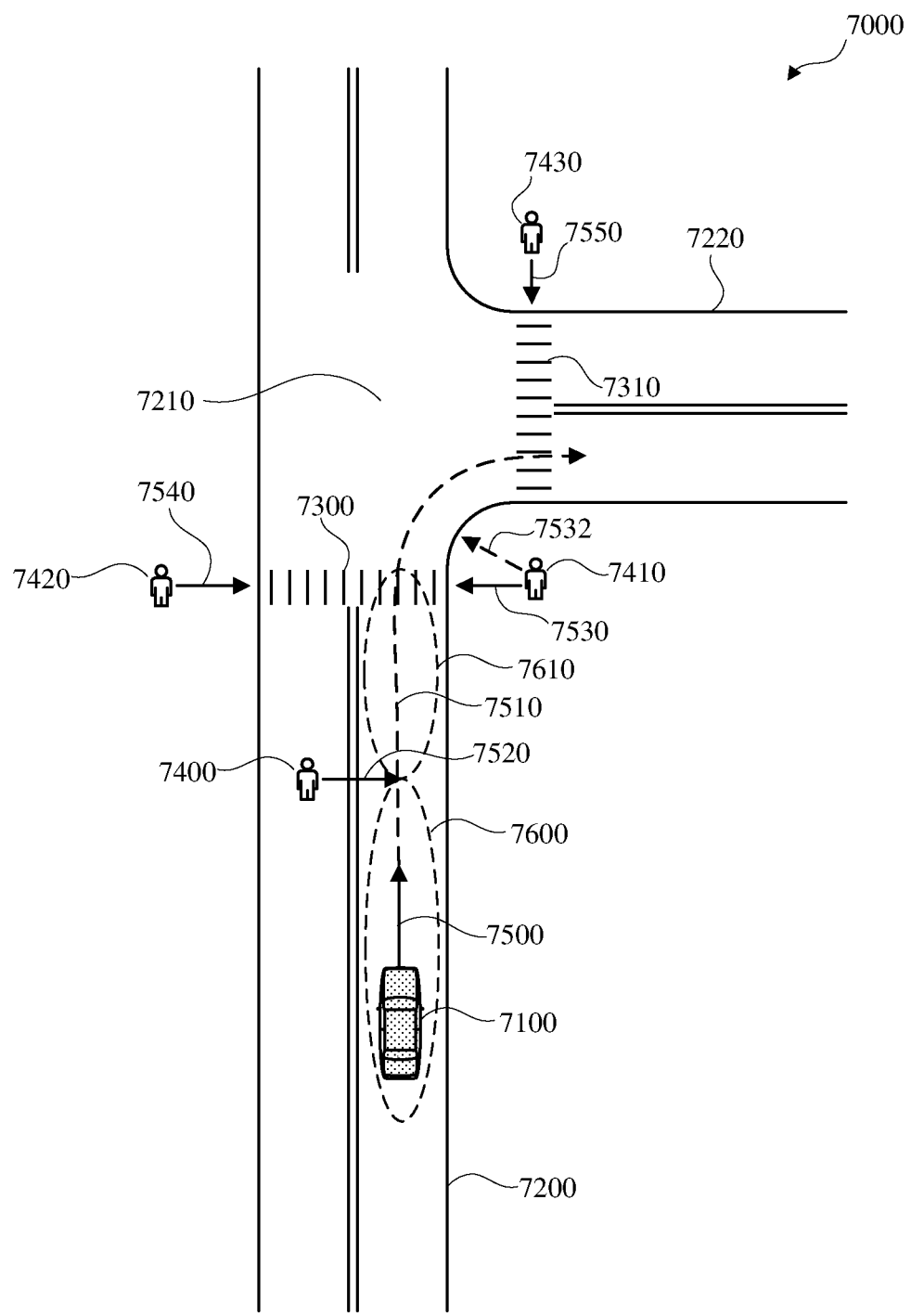
FIG. 7 is a diagram of an example of a pedestrian scene including pedestrian scenarios in accordance with embodiments of this disclosure.

The pedestrian-scenario-specific operational control evaluation module 4410 may output a candidate vehicle control action, such as a 'stop' candidate vehicle control action, an 'advance' candidate vehicle control action, or a 'proceed' candidate vehicle control action. In some embodiments, the candidate vehicle control action may be a compound vehicle control action. For example, the candidate vehicle control action may include an 'advance' vehicle control action, which may be an indirect signaling pedestrian communication vehicle control action, and may include a direct signaling pedestrian communication vehicle control action, such as flashing headlights of the autonomous vehicle or sounding a horn of the autonomous vehicle. An example of an autonomous vehicle operational control scenario that includes the autonomous vehicle traversing a portion of the vehicle transportation network proximate to a pedestrian is shown in FIG. 7.

The intersection-scenario-specific operational control evaluation module 4420 may be a model of an autonomous vehicle operational control scenario that includes the autonomous vehicle traversing a portion of the vehicle transportation network that includes an intersection. The intersection-scenario-specific operational control evaluation module 4420 may model the behavior of remote vehicles traversing an intersection in the vehicle transportation network or otherwise probabilistically affecting the operation of the autonomous vehicle traversing the intersection. An intersection may include any portion of the vehicle transportation network wherein a vehicle may transfer from one road to another.

In some embodiments, modeling an autonomous vehicle operational control scenario that includes the autonomous vehicle traversing a portion of the vehicle transportation network that includes an intersection may include determining a right-of-way order for vehicles to traverse the intersection, such as by negotiating with remote vehicles.

In some embodiments, modeling an autonomous vehicle operational control scenario that includes the autonomous vehicle traversing a portion of the vehicle transportation network that includes an intersection may include modeling one or more traffic controls, such as a stop sign, a yield sign, a traffic light, or any other traffic control device, regulation, signal, or combination thereof.

In some embodiments, modeling an autonomous vehicle operational control scenario that includes the autonomous vehicle traversing a portion of the vehicle transportation network that includes an intersection may include outputting an 'advance' candidate vehicle control action, receiving information, such as sensor information, in response to the autonomous vehicle performing the 'advance' candidate vehicle control action, and outputting a subsequent candidate vehicle control action based on the received information.

In some embodiments, modeling an autonomous vehicle operational control scenario that includes the autonomous vehicle traversing a portion of the vehicle transportation network that includes an intersection may include modeling a probability that a remote vehicle may traverse the intersection in accordance with vehicle transportation network regulations. In some embodiments, modeling an autonomous vehicle operational control scenario that includes the autonomous vehicle traversing a portion of the vehicle transportation network that includes an intersection may include modeling a probability that a remote vehicle may traverse the intersection independent of one or more vehicle transportation network regulations, such as by following closely behind or piggybacking another remote vehicle having a right-of-way.

Figure 8:
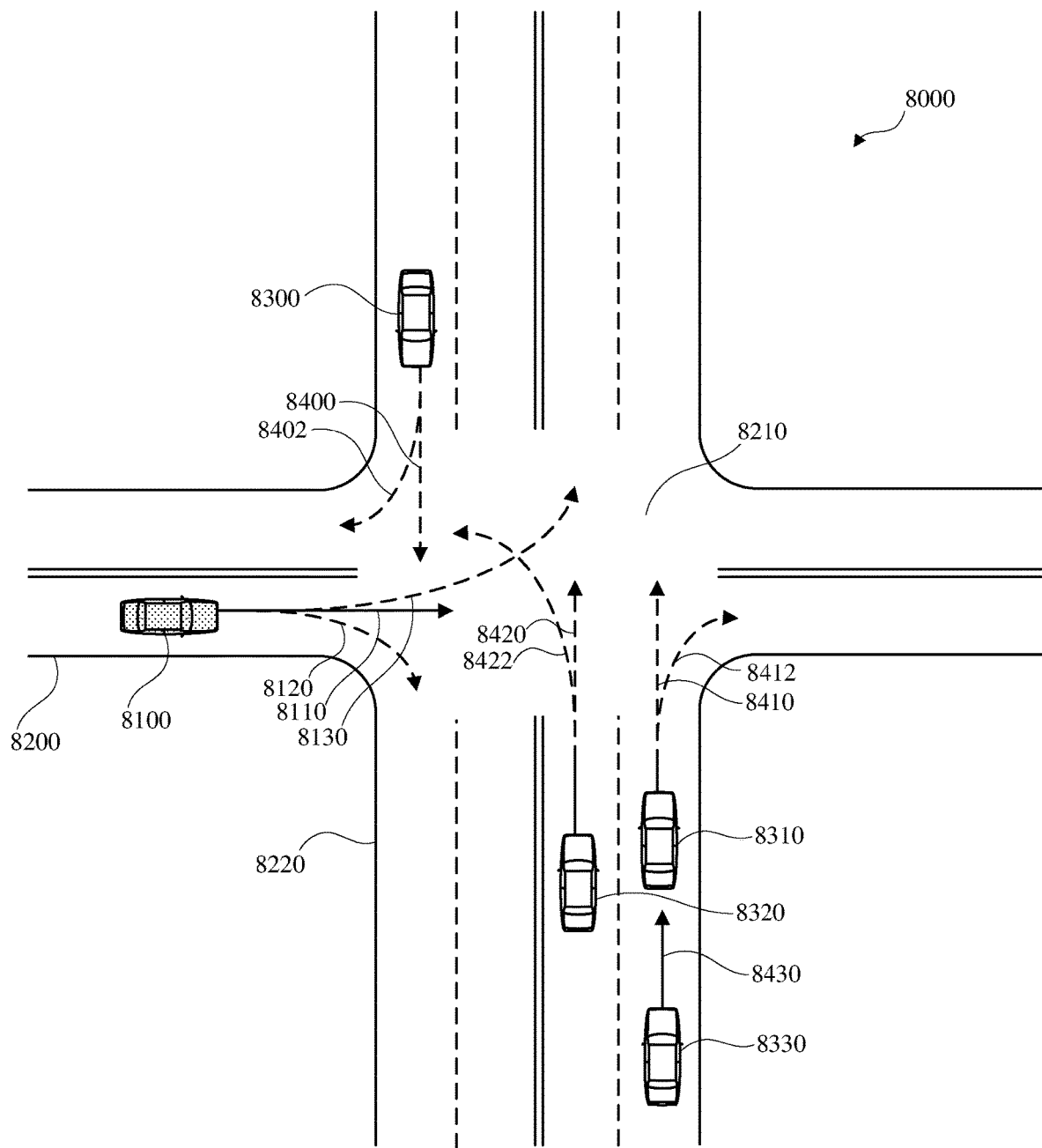
FIG. 8 is a diagram of an example of an intersection scene including intersection scenarios in accordance with embodiments of this disclosure.

The intersection-scenario-specific operational control evaluation module 4420 may output a candidate vehicle control action, such as a 'stop' candidate vehicle control action, an 'advance' candidate vehicle control action, or a 'proceed' candidate vehicle control action. In some embodiments, the candidate vehicle control action may be a compound vehicle control action. For example, the candidate vehicle control action may include a 'proceed' vehicle control action and a signaling communication vehicle control action, such as flashing a turn signal of the autonomous vehicle. An example of an autonomous vehicle operational control scenario that includes the autonomous vehicle traversing an intersection is shown in FIG. 8.

The lane change-scenario-specific operational control evaluation module 4430 may be a model of an autonomous vehicle operational control scenario that includes the autonomous vehicle traversing a portion of the vehicle transportation network by performing a lane change operation. The lane change-scenario-specific operational control evaluation module 4430 may model the behavior of remote vehicles probabilistically affecting the operation of the autonomous vehicle traversing the lane change.

Figure 9:
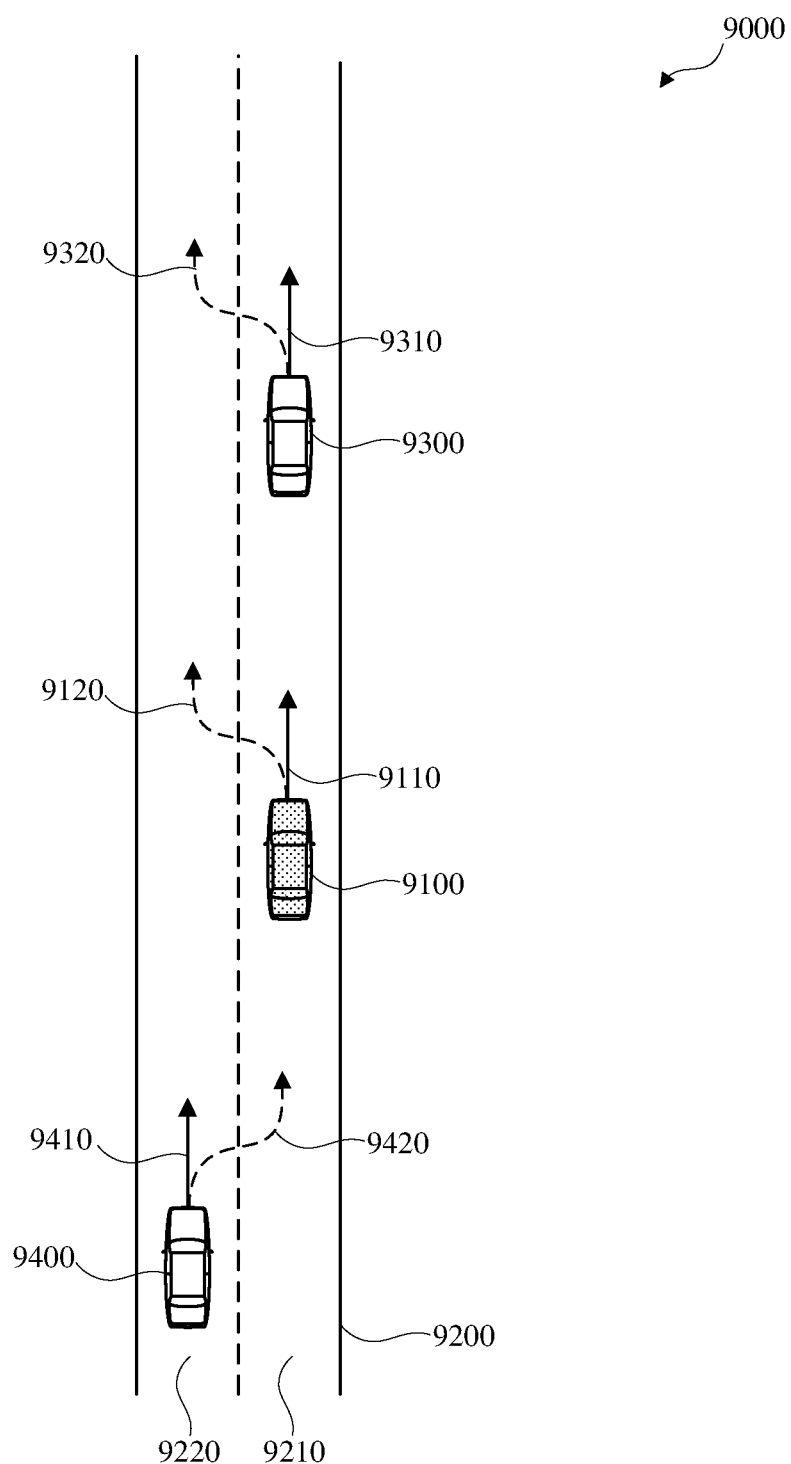
FIG. 9 is a diagram of an example of a lane change scene including a lane change scenario in accordance with embodiments of this disclosure.

In some embodiments, modeling an autonomous vehicle operational control scenario that includes the autonomous vehicle traversing a portion of the vehicle transportation network by performing a lane change may include outputting 'maintain' candidate vehicle control action, a 'proceed' vehicle control action, an 'accelerate' vehicle control action, a 'decelerate' vehicle control action, or a combination thereof. An example of an autonomous vehicle operational control scenario that includes the autonomous vehicle changing lanes is shown in FIG. 9.

In some embodiments, one or more of the autonomous vehicle operational management controller 4100, the blocking monitor 4200, the operational environment monitors 4300, or the scenario-specific operation control evaluation modules 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the scenario-specific operation control evaluation modules 4400 may be independent of the operational rate of another one or more of the autonomous vehicle operational management controller 4100, the blocking monitor 4200, the operational environment monitors 4300, or the scenario-specific operation control evaluation modules 4400.

In some embodiments, the candidate vehicle control actions output by the instances of the scenario-specific operation control evaluation modules 4400 may include, or be associated with, operational environment information, such as state information, temporal information, or both. For example, a candidate vehicle control action may be associated with operational environment information representing a possible future state, a future temporal location, or both. In some embodiments, the autonomous vehicle operational management controller 4100 may identify stale candidate vehicle control actions representing past temporal locations, states having a probability of occurrence below a minimum threshold, or unelected candidate vehicle control actions, and may delete, omit, or ignore the stale candidate vehicle control actions.

Figure 5:
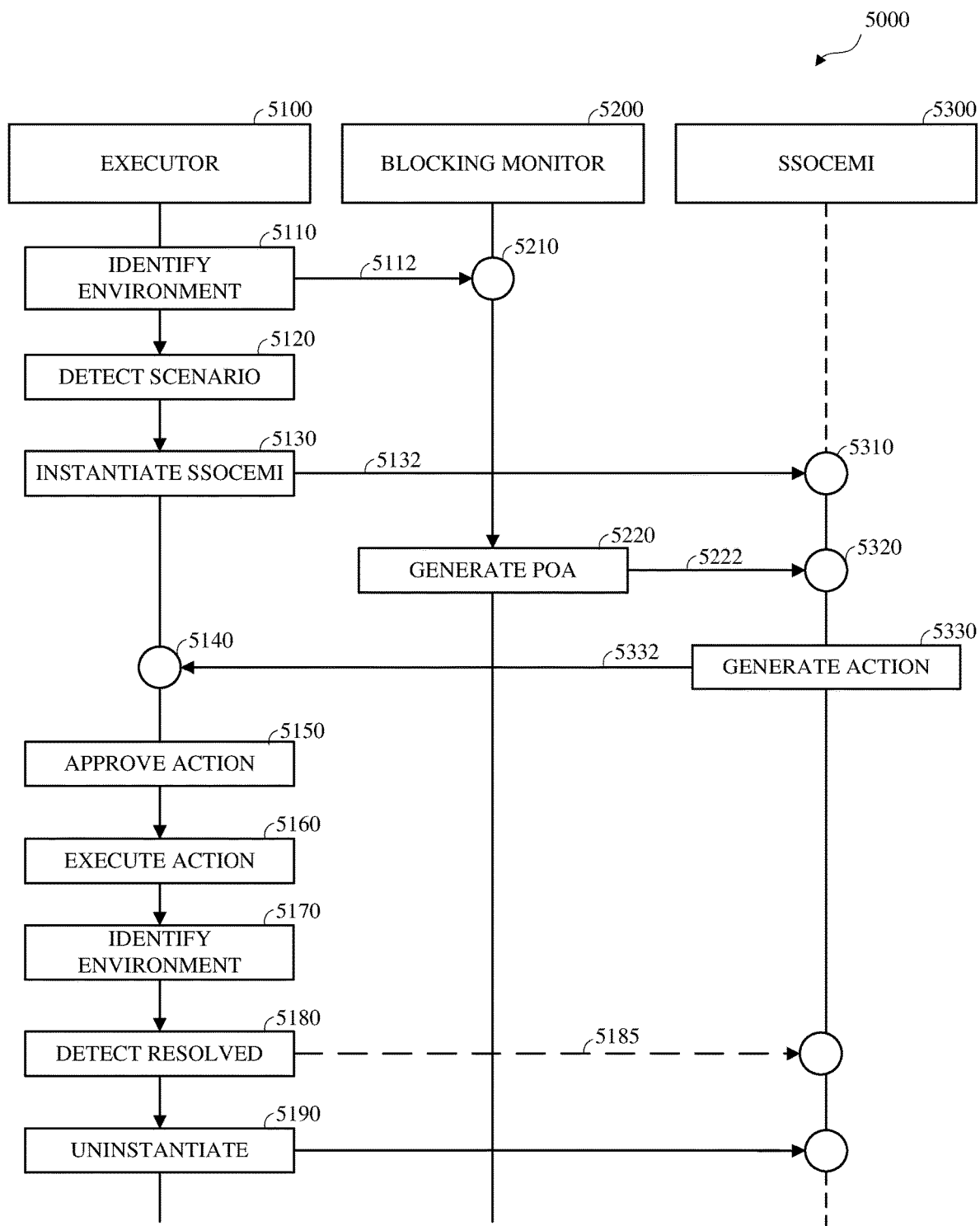
FIG. 5 is a flow diagram of an example of an autonomous vehicle operational management in accordance with embodiments of this disclosure.

FIG. 5 is a flow diagram of an example of an autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

Autonomous vehicle operational management 5000 may include implementing or operating one or more modules or components, which may include operating an autonomous vehicle operational management controller or executor 5100, such as the autonomous vehicle operational management controller 4100 shown in FIG. 4; a blocking monitor 5200, such as the blocking monitor, 4200 shown in FIG. 4; zero or more scenario-specific operational control evaluation module instances (SSOCEMI) 5300, such as instances of the scenario-specific operational control evaluation modules 4400 shown in FIG. 4; or a combination thereof.

Although not shown separately in FIG. 5, in some embodiments, the executor 5100 may monitor the operational environment of the autonomous vehicle, or defined aspects thereof. In some embodiments, monitoring the operational environment of the autonomous vehicle may include identifying and tracking external objects at 5110, identifying distinct vehicle operational scenarios at 5120, or a combination thereof.

The executor 5100 may identify an operational environment, or an aspect thereof, of the autonomous vehicle at

5110. Identifying the operational environment may include identifying operational environment information representing the operational environment, or one or more aspects thereof. In some embodiments, the operational environment information may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, or a combination thereof.

In some embodiments, the executor 5100 may identify the operational environment information at 5110 based on sensor information, vehicle transportation network information, previously identified operational environment information, or any other information or combination of information describing an aspect or aspects of the operational environment. In some embodiments, the sensor information may be processed sensor information, such as processed sensor information from a sensor information processing unit of the autonomous vehicle, which may receive sensor information from the sensor of the autonomous vehicle and may generate the processed sensor information based on the sensor information.

In some embodiments, identifying the operational environment information at 5110 may include receiving information indicating one or more aspects of the operational environment from a sensor of the autonomous vehicle, such as the sensor 1360 shown in FIG. 1 or the on-vehicle sensors 2105 shown in FIG. 2. For example, the sensor may detect an external object, such as a pedestrian, a vehicle, or any other object, external to the autonomous vehicle, within a defined distance, such as 300 meters, of the autonomous vehicle, and the sensor may send sensor information indicating or representing the external object to the executor 5100. In some embodiments, the sensor, or another unit of the autonomous vehicle, may store the sensor information in a memory, such as the memory 1340 shown in FIG. 1, of the autonomous vehicle and the autonomous vehicle operational management controller 5100 reading the sensor information from the memory.

In some embodiments, the external object indicated by the sensor information may be indeterminate, and the autonomous vehicle operational management controller 5100 may identify object information, such as an object type, based on the sensor information, other information, such as information from another sensor, information corresponding to a previously identified object, or a combination thereof. In some embodiments, the sensor, or another unit of the autonomous vehicle may identify the object information and may send the object identification information to the autonomous vehicle operational management controller 5100.

In some embodiments, the sensor information may indicate a road condition, a road feature, or a combination thereof. For example, the sensor information may indicate a road condition, such as a wet road condition, an icy road condition, or any other road condition or conditions. In another example, the sensor information may indicate road markings, such as a lane line, an aspect of roadway geometry, or any other road feature or features.

In some embodiments, identifying the operational environment information at 5110 may include identifying information indicating one or more aspects of the operational environment from vehicle transportation network information. For example, the autonomous vehicle operational management controller 5100 may read, or otherwise receive, vehicle transportation network information indicating that the autonomous vehicle is approaching an intersection, or otherwise describing a geometry or configuration of the vehicle transportation network proximate to the autonomous vehicle, such as within 300 meters of the autonomous vehicle.

In some embodiments, identifying the operational environment information at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

In some embodiments, the executor 5100 may include one or more scenario-specific monitor module instances. For example, the executor 5100 may include a scenario-specific monitor module instance for monitoring pedestrians, a scenario-specific monitor module instance for monitoring intersections, a scenario-specific monitor module instance for monitoring lane changes, or a combination thereof. Each scenario-specific monitor module instance may receive, or otherwise access, operational environment information corresponding to the respective scenario, and may send, store, or otherwise output to, or for access by, the executor 5100, the blocking monitor 5200, the scenario-specific operational control evaluation module instance 5300, or a combination thereof specialized monitor information corresponding to the respective scenario.

In some embodiments, the executor 5100 may send the operational environment information representing an operational environment for the autonomous vehicle to the blocking monitor 5200 at 5112. Alternatively, or in addition, the blocking monitor 5200 may receive the operational environment information representing an operational environment for the autonomous vehicle from another component of the autonomous vehicle, such as from a sensor of the autonomous vehicle, the blocking monitor 5200 may read the operational environment information representing an operational environment for the autonomous vehicle from a memory of the autonomous vehicle, or a combination thereof.

The executor 5100 may detect or identify one or more distinct vehicle operational scenarios at 5120. In some embodiments, the executor 5100 may detect distinct vehicle operational scenarios at 5120 based on one or more aspects of the operational environment represented by the operational environment information identified at 5110.

In some embodiments, the executor 5100 may identify multiple distinct vehicle operational scenarios, which may be aspects of a compound vehicle operational scenario, at 5120. For example, the operational environment information may include information representing a pedestrian approaching an intersection along an expected path for the autonomous vehicle, and the executor 5100 may identify a pedestrian vehicle operational scenario, an intersection vehicle operational scenario, or both at 5120. In another example, the operational environment represented by the operational environment information may include multiple external objects and the executor 5100 may identify a distinct vehicle operational scenario corresponding to each external object at 5120.

The executor 5100 may instantiate a scenario-specific operational control evaluation module instance 5300 based on one or more aspects of the operational environment represented by the operational environment information at 5130. For example, the executor 5100 may instantiate the scenario-specific operational control evaluation module instance 5300 at 5130 in response to identifying a distinct vehicle operational scenario at 5120.

Although one scenario-specific operational control evaluation module instance 5300 is shown in FIG. 5, the executor 5100 may instantiate multiple scenario-specific operational control evaluation module instances 5300 based on one or more aspects of the operational environment represented by the operational environment information identified at 5110, each scenario-specific operational control evaluation module instances 5300 corresponding to a respective distinct vehicle operational scenario detected at 5120, or a combination of a distinct external object identified at 5110 and a respective distinct vehicle operational scenario detected at 5120.

For example, the operational environment represented by the operational environment information identified at 5110 may include multiple external objects, the executor 5100 may detect multiple distinct vehicle operational scenarios, which may be aspects of a compound vehicle operational scenario, at 5120 based on the operational environment represented by the operational environment information identified at 5110, and the executor 5100 may instantiate a scenario-specific operational control evaluation module instance 5300 corresponding to each distinct combination of a distinct vehicle operational scenario and an external object.

In some embodiments, a scenario-specific operational control evaluation module corresponding to the distinct vehicle operational scenario identified at 5120 may be unavailable and instantiating a scenario-specific operational control evaluation module instance 5300 at 5130 may include generating, solving, and instantiating an instance 5300 of a scenario-specific operational control evaluation module corresponding to the distinct vehicle operational scenario identified at 5120. For example, the distinct vehicle operational scenario identified at 5120 may indicate an intersection including two lanes having stop traffic control signals, such as stop signs, and two lanes having yield traffic control signals, such as yield signs, the available scenario-specific operational control evaluation modules may include a Partially Observable Markov Decision Process scenario-specific operational control evaluation module that differs from the distinct vehicle operational scenario identified at 5120, such as a Partially Observable Markov Decision Process scenario-specific operational control evaluation module that models an intersection scenario including four lanes having stop traffic control signals, and the executor 5100 may generate, solve, and instantiate an instance 5300 of a Markov Decision Process scenario-specific operational control evaluation module modeling an intersection including two lanes having stop traffic control signals and two lanes having yield traffic control signals at 5130.

In some embodiments, instantiating a scenario-specific operational control evaluation module instance at 5130 may include identifying a convergence probability of spatio-temporal convergence based on information about the autonomous vehicle, the operational environment information, or a combination thereof. Identifying a convergence probability of spatio-temporal convergence may include identifying an expected path for the autonomous vehicle, identifying an expected path for the remote vehicle, and identifying a probability of convergence for the autonomous vehicle and the remote vehicle indicating a probability that the autonomous vehicle and the remote vehicle may converge or collide based on the expected path information. The scenario-specific operational control evaluation module instance may be instantiated in response to determining that the convergence probability exceeds a defined threshold, such as a defined maximum acceptable convergence probability.

In some embodiments, instantiating a scenario-specific operational control evaluation module instances 5300 at 5130 may include sending the operational environment information representing an operational environment for the autonomous vehicle to the scenario-specific operational control evaluation module instances 5300 as indicated at 5132.

The scenario-specific operational control evaluation module instance 5300 may receive the operational environment information representing an operational environment for the autonomous vehicle, or one or more aspects thereof, at 5310. For example, the scenario-specific operational control evaluation module instance 5300 may receive the operational environment information representing an operational environment for the autonomous vehicle, or one or more aspects thereof, sent by the executor 5100 at 5132. Alternatively, or in addition, the scenario-specific operational control evaluation module instances 5300 may receive the operational environment information representing an operational environment for the autonomous vehicle from another component of the autonomous vehicle, such as from a sensor of the autonomous vehicle or from the blocking monitor 5200, the scenario-specific operational control evaluation module instances 5300 may read the operational environment information representing an operational environment for the autonomous vehicle from a memory of the autonomous vehicle, or a combination thereof.

The blocking monitor 5200 may receive the operational environment information representing an operational environment, or an aspect thereof, for the autonomous vehicle at 5210. For example, the blocking monitor 5200 may receive the operational environment information, or an aspect thereof, sent by the executor 5100 at 5112. In some embodiments, the blocking monitor 5200 may receive the operational environment information, or an aspect thereof, from a sensor of the autonomous vehicle, from an external device, such as a remote vehicle or an infrastructure device, or a combination thereof. In some embodiments, the blocking monitor 5200 may read the operational environment information, or an aspect thereof, from a memory, such as a memory of the autonomous vehicle.

The blocking monitor 5200 may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle.

In some embodiments, determining the respective probability of availability at 5220 may include identifying external objects, tracking external objects, projecting location information for external objects, projecting path information for external objects, or a combination thereof. For example, the blocking monitor 5200 may identify an external object and may identify an expected path for the external object, which may indicate a sequence of expected spatial locations, expected temporal locations, and corresponding probabilities.

In some embodiments, the blocking monitor 5200 may identify the expected path for an external object based on operational environment information, such as information indicating a current location of the external object, information indicating a current trajectory for the external object, information indicating a type of classification of the external object, such as information classifying the external object as a pedestrian or a remote vehicle, vehicle transportation network information, such as information indicating that the vehicle transportation network includes a crosswalk proximate to the external object, previously identified or tracked information associated with the external object, or any combination thereof. For example, the external object may be identified as a remote vehicle, and the expected path for the remote vehicle may be identified based on information indicating a current location of the remote vehicle, information indicating a current trajectory of the remote vehicle, information indicating a current speed of the remote vehicle, vehicle transportation network information corresponding to the remote vehicle, legal or regulatory information, or a combination thereof.

In some embodiments, the blocking monitor 5200 may send the probabilities of availability identified at 5220 to the scenario-specific operational control evaluation module instances 5300 at 5222. Alternatively, or in addition, the blocking monitor 5200 may store the probabilities of availability identified at 5220 in a memory of the autonomous vehicle, or a combination thereof. Although not expressly shown in FIG. 5, the blocking monitor 5200 may send the probabilities of availability identified at 5220 to the executor 5100 at 5212 in addition to, or in alternative to, sending the probabilities of availability to the scenario-specific operational control evaluation module instances 5300.

The scenario-specific operational control evaluation module instance 5300 may receive the probabilities of availability at 5320. For example, the scenario-specific operational control evaluation module instance 5300 may receive the probabilities of availability sent by the blocking monitor 5200 at 5222. In some embodiments, the scenario-specific operational control evaluation module instance 5300 may read the probabilities of availability from a memory, such as a memory of the autonomous vehicle.

The scenario-specific operational control evaluation module instance 5300 may solve a model of the corresponding distinct vehicle operational scenario at 5330. In some embodiments, scenario-specific operational control evaluation module instance 5300 may generate or identify a candidate vehicle control action at 5330.

In some embodiments, the scenario-specific operational control evaluation module instance 5300 may send the candidate vehicle control action identified at 5330 to the executor 5100 at 5332. Alternatively, or in addition, the scenario-specific operational control evaluation module instance 5300 may store the candidate vehicle control action identified at 5330 in a memory of the autonomous vehicle.

The executor 5100 may receive a candidate vehicle control action at 5140. For example, the executor 5100 may receive the candidate vehicle control action from the scenario-specific operational control evaluation module instance 5300 at 5140. Alternatively, or in addition, the executor 5100 may read the candidate vehicle control action from a memory of the autonomous vehicle.

The executor 5100 may approve the candidate vehicle control action, or otherwise identify the candidate vehicle control action as a vehicle control action for controlling the autonomous vehicle to traverse the vehicle transportation network, at 5150. For example, the executor 5100 may identify one distinct vehicle operational scenario at 5120, instantiate one scenario-specific operational control evaluation module instance 5300 at 5130, receive one candidate vehicle control action at 5140, and may approve the candidate vehicle control action at 5150.

In some embodiments, the executor 5100 may identify multiple distinct vehicle operational scenarios at 5120, instantiate multiple scenario-specific operational control evaluation module instances 5300 at 5130, receive multiple candidate vehicle control actions at 5140, and may approve one or more of the candidate vehicle control actions at 5150. In addition, or in the alternative, autonomous vehicle operational management 5000 may include operating one or more previously instantiated scenario-specific operational control evaluation module instances (not expressly shown), and the executor may receive candidate vehicle control actions at 5140 from the scenario-specific operational control evaluation module instance instantiated at 5130 and from one or more of the previously instantiated scenario-specific operational control evaluation module instances, and may approve one or more of the candidate vehicle control actions at 5150.

Approving a candidate vehicle control action at 5150 may include determining whether to traverse a portion of the vehicle transportation network in accordance with the candidate vehicle control action.

The executor 5100 may control the autonomous vehicle to traverse the vehicle transportation network, or a portion thereof, at 5160 in accordance with the vehicle control action identified at 5150.

The executor 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment information.

The executor 5100 may determine or detect whether a distinct vehicle operational scenario is resolved or unresolved at 5180. For example, the executor 5100 may receive operation environment information continuously or on a periodic basis, as described above. The executor 5100 may evaluate the operational environment information to determine whether the distinct vehicle operational scenario has resolved.

In some embodiments, the executor 5100 may determine that the distinct vehicle operational scenario corresponding to the scenario-specific operational control evaluation module instance 5300 is unresolved at 5180, the executor 5100 may send the operational environment information identified at 5170 to the scenario-specific operational control evaluation module instances 5300 as indicated at 5185, and uninstantiating the scenario-specific operational control evaluation module instance 5300 at 5180 may be omitted or differed.

In some embodiments, the executor 5100 may determine that the distinct vehicle operational scenario is resolved at 5180 and may uninstantiate at 5190 the scenario-specific operational control evaluation module instances 5300 corresponding to the distinct vehicle operational scenario determined to be resolved at 5180. For example, the executor 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding scenario-specific operational control evaluation module instance 5300.

Although not expressly shown in FIG. 5, the executor 5100 may continuously or periodically repeat identifying or updating the operational environment information at 5170, determining whether the distinct vehicle operational scenario is resolved at 5180, and, in response to determining that the distinct vehicle operational scenario is unresolved at 5180, sending the operational environment information identified at 5170 to the scenario-specific operational control evaluation module instances 5300 as indicated at 5185, until determining whether the distinct vehicle operational scenario is resolved at 5180 includes determining that the distinct vehicle operational scenario is resolved.

Figure 6:
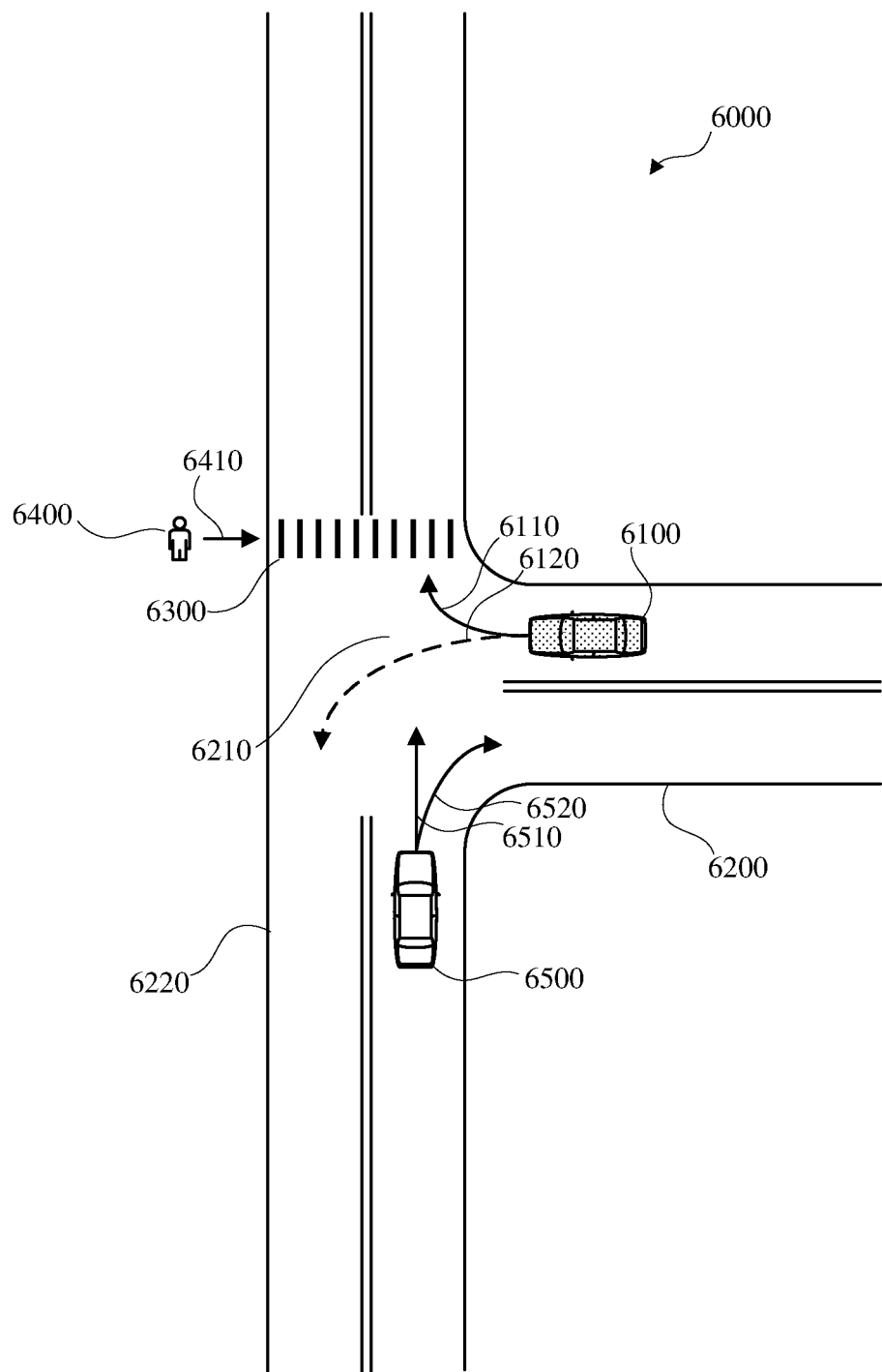
FIG. 6 is a diagram of an example of a blocking scene in accordance with embodiments of this disclosure.

FIG. 6 is a diagram of an example of a blocking scene 6000 in accordance with embodiments of this disclosure. Autonomous vehicle operational management, such as the autonomous vehicle operational management 5000 shown in FIG. 5, may include an autonomous vehicle 6100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 including a blocking monitor, such as the blocking monitor 4200 shown in FIG. 4 or the blocking monitor 5200 shown in FIG. 5, to determine a probability of availability, or a corresponding blocking probability, for a portion or an area of a vehicle transportation network corresponding to the blocking scene 6000. The blocking monitor may operate, and probabilities of availability may be determined, in conjunction with, or independent of, defined autonomous vehicle operational control scenarios.

The portion of the vehicle transportation network corresponding to the blocking scene 6000 shown in FIG. 6 includes the autonomous vehicle 6100 traversing a first road 6200, approaching an intersection 6210 with a second road 6220. The intersection 6210 includes a crosswalk 6300. A pedestrian 6400 is approaching the crosswalk 6300. A remote vehicle 6500 is traversing the second road 6220 approaching the intersection 6210. An expected path 6110 for the autonomous vehicle 6100 indicates that the autonomous vehicle 6100 may traverse the intersection 6210 by turning right from the first road 6200 to the second road 6220. An alternative expected path 6120 for the autonomous vehicle 6100, shown using a broken line, indicates that the autonomous vehicle 6100 may traverse the intersection 6210 by turning left from the first road 6200 to the second road 6220.

The blocking monitor may identify an expected path 6410 for the pedestrian 6400. For example, sensor information may indicate that the pedestrian 6400 has a speed exceeding a threshold and a trajectory intersecting the crosswalk 6300, vehicle transportation network information may indicate that the intersection includes regulatory controls such that traversing the intersection in accordance with the regulatory controls by the vehicles yielding to pedestrians in the crosswalk, or the intersection 6210 may include one or more traffic control devices (not shown) indicating a permitted right-of-way signal for the pedestrian 6400, and the expected path 6410 for the pedestrian 6400 may be identified as including the pedestrian 6400 traversing the crosswalk 6300 with a high probability, such as 1.0 or 100%.

The blocking monitor may identify expected paths 6510, 6520 for the remote vehicle 6500. For example, sensor information may indicate that the remote vehicle 6500 is approaching the intersection 6210, vehicle transportation network information may indicate that the remote vehicle 6500 may traverse straight through the intersection 6210 or may turn right at the intersection 6210 onto the first road 6200, and the blocking monitor may identify a first expected path 6510 straight through the intersection, and a second expected path 6520 turning right through the intersection for the remote vehicle 6500.

In some embodiments, the blocking monitor may identify a probability for each of the expected paths 6510, 6520 based on, for example, operating information for the remote vehicle 6500. For example, the operating information for the remote vehicle 6500 may indicate a speed for the remote vehicle that exceeds a maximum turning threshold, and the first expected path 6510 may be identified with a high probability, such as 0.9 or 90%, and the second expected path 6520 may be identified with a low probability, such as 0.1 or 10%.

In another example, the operating information for the remote vehicle 6500 may indicate a speed for the remote vehicle that is within the maximum turning threshold, and the first expected path 6510 may be identified with a low probability, such as 0.1 or 10%, and the second expected path 6520 may be identified with a high probability, such as 0.9 or 90%.

The blocking monitor may identify a probability of availability for the portion or area of the second road 6220 proximate to, such as within a few, such as three, feet, of the expected path 6410 of the pedestrian, which may correspond with the crosswalk 6300, as low, such as 0%, indicating that the corresponding portion of the second road 6220 is blocked for a temporal period corresponding to the pedestrian 6400 traversing the crosswalk 6300.

The blocking monitor may determine that the first expected path 6510 for the remote vehicle 6500 and the expected path of the autonomous vehicle 6100 are blocked by the pedestrian concurrent with the temporal period corresponding to the pedestrian 6400 traversing the crosswalk 6300.

FIG. 7 is a diagram of an example of a pedestrian scene 7000 including pedestrian scenarios in accordance with embodiments of this disclosure. Autonomous vehicle operational management, such as the autonomous vehicle operational management 5000 shown in FIG. 5, may include an autonomous vehicle 7100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4, including a pedestrian-scenario-specific operational control evaluation module instance, which may be an instance of a pedestrian-scenario-specific operational control evaluation module, such as the pedestrian-scenario-specific operational control evaluation module 4410 shown in FIG. 4, which may be a model of an autonomous vehicle operational control scenario that includes the autonomous vehicle 7100 traversing a portion of the vehicle transportation network proximate to a pedestrian. For simplicity and clarity, the portion of the vehicle transportation network corresponding to the pedestrian scene 7000 shown in FIG. 7 is oriented with north at the top and east at the right.

The portion of the vehicle transportation network corresponding to the pedestrian scene 7000 shown in FIG. 7 includes the autonomous vehicle 7100 traversing northward along a road segment in a lane of a first road 7200, approaching an intersection 7210 with a second road 7220. The intersection 7210 includes a first crosswalk 7300 across the first road 7200, and a second crosswalk 7310 across the second road 7220. A first pedestrian 7400 is in the first road 7200 moving east at a non-pedestrian access area (jaywalking). A second pedestrian 7410 is proximal to the first crosswalk 7300 and is moving west-northwest. A third pedestrian 7420 is approaching the first crosswalk 7300 from the west. A fourth pedestrian 7430 is approaching the second crosswalk 7310 from the north.

The autonomous vehicle operational management system may include an autonomous vehicle operational management controller, such as the autonomous vehicle operational management controller 4100 shown in FIG. 4 or the executor 5100 shown in FIG. 5, and a blocking monitor, such as the blocking monitor 4200 shown in FIG. 4 or the blocking monitor 5200 shown in FIG. 5. The autonomous vehicle 7100 may include one or more sensors, one or more operational environment monitors, or a combination thereof.

In some embodiments, the autonomous vehicle operational management system may operate continuously or periodically, such as at each temporal location in a sequence of temporal locations. For simplicity and clarity, the geospatial location of the autonomous vehicle 7100, the first pedestrian 7400, the second pedestrian 7410, the third pedestrian 7420, and the fourth pedestrian 7430 is shown in accordance with a first, sequentially earliest, temporal location from the sequence of temporal locations. Although described with reference to a sequence of temporal locations for simplicity and clarity, each unit of the autonomous vehicle operational management system may operate at any frequency, the operation of respective units may be synchronized or unsynchronized, and operations may be performed concurrently with one or more portions of one or more temporal locations. For simplicity and clarity, respective descriptions of one or more temporal locations, such as temporal locations between the temporal locations described herein, may be omitted from this disclosure.

At one or more temporal location, such as at each temporal location, the sensors of the autonomous vehicle 7100 may detect information corresponding to the operational environment of the autonomous vehicle 7100, such as information corresponding to one or more of the pedestrians 7400, 7410, 7420, 7430.

At one or more temporal location, such as at each temporal location, the autonomous vehicle operational management system may identify an expected path 7500 for the autonomous vehicle 7100, a route 7510 for the autonomous vehicle 7100, or both. In accordance with the first temporal location, the expected path 7500 for the autonomous vehicle 7100 indicates that the autonomous vehicle 7100 may traverse the intersection 7210 by proceeding north along the first road 7200. The route 7510 for the autonomous vehicle 7100 indicates that the autonomous vehicle 7100 may turn right onto the second road 7220.

At one or more temporal location, such as at each temporal location, the operational environment monitors of the autonomous vehicle 7100 may identify or generate operational environment information representing an operational environment, or an aspect thereof, of the autonomous vehicle 7100, such as in response to receiving sensor information corresponding to the pedestrians 7400, 7410, 7420, which may include associating the sensor information with the pedestrians 7400, 7410, 7420, 7430, and may output the operational environment information, which may include information representing the pedestrians 7400, 7410, 7420, 7430, to the autonomous vehicle operational management controller.

At one or more temporal location, such as at each temporal location, the blocking monitor may generate probability of availability information indicating respective probabilities of availability for one or more areas or portions of the vehicle transportation network. For example, in accordance with the first temporal location, the blocking monitor may determine an expected path 7520 for the first pedestrian 7400 and a probability of availability for an area or a portion of the vehicle transportation network proximate to a point of convergence between the expected path 7520 for the first pedestrian 7400 and the expected path 7500, or the route 7510, for the autonomous vehicle 7100.

In another example, the blocking monitor may determine an expected path 7530 for the second pedestrian 7410, an expected path 7540 for the third pedestrian 7420, and a probability of availability for an area or a portion of the vehicle transportation network proximate to the first crosswalk 7300. Identifying the probability of availability for the area or portion of the vehicle transportation network proximate to the first crosswalk 7300 may include identifying the second pedestrian 7410 and the third pedestrian 7420 as preferentially blocking external objects and determining that the corresponding expected paths 7530, 7540 may overlap spatially and temporally.

In another example, the blocking monitor may determine multiple expected paths for one or more external objects. For example, the blocking monitor may identify a first expected path 7530 for the second pedestrian 7410 with a high probability and may identify a second expected path 7532 for the second pedestrian 7410 with a low probability.

In another example, the blocking monitor may determine an expected path 7550 for the fourth pedestrian 7430 and a probability of availability for an area or a portion of the vehicle transportation network proximate to the second crosswalk 7310.

In some embodiments, generating the probability of availability information may include generating probabilities of availability for a respective area or portion of the vehicle transportation network corresponding to multiple temporal locations from the sequence of temporal locations. The blocking monitor may output the probability of availability information to, or for access by, the autonomous vehicle operational management controller.

At one or more temporal location, such as at each temporal location, the autonomous vehicle operational management controller may generate operational environment information, or update previously generated operational environment information, which may include receiving the operational environment information or a portion thereof.

At one or more temporal location, such as at each temporal location, the autonomous vehicle operational management controller may detect or identify one or more distinct vehicle operational scenarios, such as based on the operational environment represented by the operational environment information, which may include the operational environment information output by the operational environment monitors, the probability of availability information output by the blocking monitor, or a combination thereof. For example, in accordance with the first temporal location, the autonomous vehicle operational management controller may detect or identify one or more of a first pedestrian scenario including the first pedestrian 7400, a second pedestrian scenario including the second pedestrian 7410, a third pedestrian scenario including the third pedestrian 7420, and a fourth pedestrian scenario including the fourth pedestrian 7430.

At one or more temporal location, such as at each temporal location, the autonomous vehicle operational management controller may detect one or more previously undetected vehicle operational scenarios. For example, in accordance with the first temporal location the autonomous vehicle operational management controller may detect the first vehicle operational scenario and in accordance with a second temporal location from the sequence of temporal locations, such as a temporal location subsequent to the first temporal location, the autonomous vehicle operational management controller may detect the second vehicle operational scenario.

At one or more temporal location, such as at each temporal location, the autonomous vehicle operational management controller may instantiate one or more pedestrian-scenario-specific operational control evaluation module instances in response to detecting or identifying one or more of the first pedestrian scenario including the first pedestrian 7400, the second pedestrian scenario including the second pedestrian 7410, the third pedestrian scenario including the third pedestrian 7420, or the fourth pedestrian scenario including the fourth pedestrian 7430.

For example, in accordance with the first temporal location, the autonomous vehicle operational management controller may detect the first pedestrian scenario including the first pedestrian 7400, may determine that a pedestrian-scenario-specific operational control evaluation module corresponding to the first pedestrian scenario is available, and may instantiate a first pedestrian-scenario-specific operational control evaluation module instance in response to detecting the first pedestrian scenario including the first pedestrian 7400.

In another example, the autonomous vehicle operational management controller may detect the first pedestrian scenario including the first pedestrian 7400, determine that a pedestrian-scenario-specific operational control evaluation module corresponding to the first pedestrian scenario is unavailable, generate and solve a pedestrian-scenario-specific operational control evaluation module pedestrian-scenario-specific operational control evaluation module corresponding to the first pedestrian scenario, and instantiate an instance of the pedestrian-scenario-specific operational control evaluation module corresponding to the first pedestrian scenario in response to detecting the first pedestrian scenario including the first pedestrian 7400.

In some embodiments, the autonomous vehicle operational management controller may detect or identify one or more of the pedestrian scenarios substantially concurrently. For example, the autonomous vehicle operational management controller may detect or identify the second pedestrian scenario including the second pedestrian 7410 and the third pedestrian scenario including the third pedestrian 7420 substantially concurrently.

In some embodiments, the autonomous vehicle operational management controller may instantiate two or more respective instances of respective pedestrian-scenario-specific operational control evaluation modules substantially concurrently. For example, the autonomous vehicle operational management controller may detect or identify the second pedestrian scenario including the second pedestrian 7410 and the third pedestrian scenario including the third pedestrian 7420 substantially concurrently, and may instantiate an instance of the pedestrian-scenario-specific operational control evaluation module corresponding to the second pedestrian scenario substantially concurrently with instantiating an instance of the pedestrian-scenario-specific operational control evaluation module corresponding to the third pedestrian scenario.

In another example, the autonomous vehicle operational management controller may detect or identify the second pedestrian scenario including the first expected path 7530 for the second pedestrian 7410 and a fifth pedestrian scenario including the second expected path 7532 for the second pedestrian 7410 substantially concurrently, and may instantiate an instance of a pedestrian-scenario-specific operational control evaluation module corresponding to the second pedestrian scenario substantially concurrently with instantiating an instance of a pedestrian-scenario-specific operational control evaluation module corresponding to the fifth pedestrian scenario.

At one or more temporal location, such as at each temporal location, the autonomous vehicle operational management controller may send, or otherwise make available, operational environment information, such as new or updated operational environment information, to previously instantiated, or operating, scenario-specific operational control evaluation module instances.

Instantiating, or updating, a scenario-specific operational control evaluation module instance may include providing the operational environment information, or a portion thereof, such as the sensor information or the probabilities of availability, to the respective scenario-specific operational control evaluation module instances, such as by sending the operational environment information, or a portion thereof, to the respective scenario-specific operational control evaluation module instances, or storing the operational environment information, or a portion thereof, for access by the respective scenario-specific operational control evaluation module instances.

At one or more temporal location, such as at each temporal location, the respective pedestrian-scenario-specific operational control evaluation module instances may receive, or otherwise access, the operational environment information corresponding to the respective autonomous vehicle operational control scenarios. For example, in accordance with the first temporal location, the first pedestrian-scenario-specific operational control evaluation module instance may receive operational environment information corresponding to the first pedestrian scenario, which may include the probability of availability information for the area or portion of the vehicle transportation network proximate to the point of convergence between the expected path 7520 for the first pedestrian 7400 and the expected path 7500, or the route 7510, for the autonomous vehicle 7100.

A pedestrian-scenario-specific operational control evaluation module may model a pedestrian scenario as including states representing spatiotemporal locations for the autonomous vehicle 7100, spatiotemporal locations for the respective pedestrian 7400, 7410, 7420, 7430, and corresponding blocking probabilities. A pedestrian-scenario-specific operational control evaluation module may model a pedestrian scenario as including actions such as 'stop' (or 'wait'), 'advance', and 'proceed'. A pedestrian-scenario-specific operational control evaluation module may model a pedestrian scenario as including state transition probabilities representing probabilities that a respective pedestrian enters an expected path of the autonomous vehicle, such as by traversing an expected path associated with the respective pedestrian. The state transition probabilities may be determined based on the operational environment information. A pedestrian-scenario-specific operational control evaluation module may model a pedestrian scenario as including negative value rewards for violating traffic control regulations, and including a positive value reward for completing the pedestrian scenario.

At one or more temporal location, such as at each temporal location, each instantiated pedestrian-scenario-specific operational control evaluation module instance may generate a respective candidate vehicle control action, such as 'stop', 'advance', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

At one or more temporal location, such as at each temporal location, the autonomous vehicle operational management controller may receive candidate vehicle control actions from the respective instantiated pedestrian-scenario-specific operational control evaluation module instances and may identify a vehicle control action based on the received candidate vehicle control actions for controlling the autonomous vehicle 7100 at the corresponding temporal location and may control the autonomous vehicle to traverse the vehicle transportation network, or a portion thereof, in accordance with the identified vehicle control action.

At one or more temporal location, such as at each temporal location, the autonomous vehicle operational management controller may determine whether one or more of the detected vehicle operational scenarios has expired and, in response to determining that a vehicle operational scenarios has expired, may uninstantiate corresponding pedestrian-scenario-specific operational control evaluation module instances.

FIG. 8 is a diagram of an example of an intersection scene 8000 including intersection scenarios in accordance with embodiments of this disclosure. Autonomous vehicle operational management, such as the autonomous vehicle operational management 5000 shown in FIG. 5, may include an autonomous vehicle 8100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4, including an intersection-scenario-specific operational control evaluation module instance, which may be an instance of an intersection-scenario-specific operational control evaluation module, such as the intersection-scenario-specific operational control evaluation module 4420 shown in FIG. 4, which may be a model of an autonomous vehicle operational control scenario that includes the autonomous vehicle 8100 traversing a portion of the vehicle transportation network including an intersection. For simplicity and clarity, the portion of the vehicle transportation network corresponding to the intersection scene 8000 shown in FIG. 8 is oriented with north at the top and east at the right.

The portion of the vehicle transportation network corresponding to the intersection scene 8000 shown in FIG. 8 includes the autonomous vehicle 8100 traversing a first road 8200 from west to east, approaching an intersection 8210 with a second road 8220. An expected path 8110 for the autonomous vehicle 8100 indicates that the autonomous vehicle 8100 may traverse straight through the intersection 8210. A first alternative expected path 8120 for the autonomous vehicle 8100, shown using a broken line, indicates that the autonomous vehicle 8100 may traverse the intersection 8210 by turning right from the first road 8200 to the second road 8220. A second alternative expected path 8130 for the autonomous vehicle 8100, shown using a broken line, indicates that the autonomous vehicle 8100 may traverse the intersection 8210 by turning left from the first road 8200 to the second road 8220.

A first remote vehicle 8300 is shown traversing south along a first southbound lane the second road 8220 approaching the intersection 8210. A second remote vehicle 8310 is shown traversing north along a first northbound lane of the second road 8220 approaching the intersection 8210. A third remote vehicle 8320 is shown traversing north along a second northbound lane of the second road 8220 approaching the intersection 8210. A fourth remote vehicle 8330 is shown traversing north along the first northbound lane of the second road 8220 approaching the intersection 8210.

The autonomous vehicle operational management system may include an autonomous vehicle operational management controller, such as the autonomous vehicle operational management controller 4100 shown in FIG. 4 or the executor 5100 shown in FIG. 5, and a blocking monitor, such as the blocking monitor 4200 shown in FIG. 4 or the blocking monitor 5200 shown in FIG. 5. The autonomous vehicle 8100 may include one or more sensors, one or more operational environment monitors, or a combination thereof.

In some embodiments, the autonomous vehicle operational management system may operate continuously or periodically, such as at each temporal location in a sequence of temporal locations. For simplicity and clarity, the geospatial location of the autonomous vehicle 8100, the first remote vehicle 8300, the second remote vehicle 8310, the third remote vehicle 8320, and the fourth remote vehicle 8330 is shown in accordance with a first, sequentially earliest, temporal location from the sequence of temporal locations. Although described with reference to a sequence of temporal locations for simplicity and clarity, each unit of the autonomous vehicle operational management system may operate at any frequency, the operation of respective units may be synchronized or unsynchronized, and operations may be performed concurrently with one or more portions of one or more temporal locations. For simplicity and clarity, respective descriptions of one or more temporal locations, such as temporal locations between the temporal locations described herein, may be omitted from this disclosure.

At one or more temporal location, such as at each temporal location, the sensors of the autonomous vehicle 8100 may detect information corresponding to the operational environment of the autonomous vehicle 8100, such as information corresponding to one or more of the remote vehicles 8300, 8310, 8320, 8330.

At one or more temporal location, such as at each temporal location, the autonomous vehicle operational management system may identify an expected path 8110, 8120, 8130 for the autonomous vehicle 8100, a route (not shown) for the autonomous vehicle 8100, or both.

At one or more temporal location, such as at each temporal location, the operational environment monitors of the autonomous vehicle 8100 may identify or generate operational environment information representing an operational environment, or an aspect thereof, of the autonomous vehicle 8100, such as in response to receiving sensor information corresponding to the remote vehicles 8300, 8310, 8320, 8330, which may include associating the sensor information with the remote vehicles 8300, 8310, 8320, 8330, and may output the operational environment information, which may include information representing the remote vehicles 8300, 8310, 8320, 8330, to the autonomous vehicle operational management controller.

At one or more temporal location, such as at each temporal location, the blocking monitor may generate probability of availability information indicating respective probabilities of availability for one or more areas or portions of the vehicle transportation network. For example, the blocking monitor may determine one or more probable expected paths 8400, 8402 for the first remote vehicle 8300, one or more probable expected paths 8410, 8412 for the second remote vehicle 8310, one or more probable expected paths 8420, 8422 for the third remote vehicle 8320, and an expected path 8430 for the fourth remote vehicle 8330. The blocking monitor may generate probability of availability information indicating respective probabilities of availability for one or more areas or portions of the vehicle transportation network corresponding to one or more of the expected path 8110 for the autonomous vehicle 8100, the first alternative expected path 8120 for the autonomous vehicle 8100, or the second alternative expected path 8130 for the autonomous vehicle 8100.

In some embodiments, generating the probability of availability information may include generating probabilities of availability for a respective area or portion of the vehicle transportation network corresponding to multiple temporal locations from the sequence of temporal locations. The blocking monitor may output the probability of availability information to, or for access by, the autonomous vehicle operational management controller.

At one or more temporal location, such as at each temporal location, the autonomous vehicle operational management controller may generate operational environment information, or update previously generated operational environment information, which may include receiving the operational environment information or a portion thereof.

At one or more temporal location, such as at each temporal location, the autonomous vehicle operational management controller may detect or identify one or more distinct vehicle operational scenarios, such as based on the operational environment represented by the operational environment information, which may include the operational environment information output by the operational environment monitors, the probability of availability information output by the blocking monitor, or a combination thereof. For example, the autonomous vehicle operational management controller may detect or identify one or more of a first intersection scenario including the first remote vehicle 8300, a second intersection scenario including the second remote vehicle 8310, a third intersection scenario including the third remote vehicle 8320, and a fourth intersection scenario including the fourth remote vehicle 8330.

At one or more temporal location, such as at each temporal location, the autonomous vehicle operational management controller may detect one or more previously undetected vehicle operational scenarios. For example, in accordance with a first temporal location the autonomous vehicle operational management controller may detect the first intersection scenario and in accordance with a second temporal location from the sequence of temporal locations, such as a temporal location subsequent to the first temporal location, the autonomous vehicle operational management controller may detect the second intersection scenario.

At one or more temporal location, such as at each temporal location, the autonomous vehicle operational management controller may instantiate one or more intersection-scenario-specific operational control evaluation module instances in response to detecting or identifying one or more of the first intersection scenario, the second intersection scenario, the third intersection scenario, or the fourth intersection scenario.

In some embodiments, the autonomous vehicle operational management controller may detect or identify one or more of the intersection scenarios substantially concurrently. For example, the autonomous vehicle operational management controller may detect or identify the second intersection scenario and the third intersection scenario substantially concurrently.

In some embodiments, the autonomous vehicle operational management controller may instantiate two or more respective instances of respective intersection-scenario-specific operational control evaluation modules substantially concurrently. For example, the autonomous vehicle operational management controller may detect or identify the second intersection scenario and the third intersection scenario substantially concurrently, and may instantiate an instance of the intersection-scenario-specific operational control evaluation module corresponding to the second intersection scenario substantially concurrently with instantiating an instance of the intersection-scenario-specific operational control evaluation module corresponding to the third intersection scenario.

In another example, the autonomous vehicle operational management controller may detect or identify the second intersection scenario including the first expected path 8400 for the first remote vehicle 8300 and a fifth intersection scenario including the second expected path 8402 for the first remote vehicle 8300 substantially concurrently, and may instantiate an instance of an intersection-scenario-specific operational control evaluation module corresponding to the second intersection scenario substantially concurrently with instantiating an instance of an intersection-scenario-specific operational control evaluation module corresponding to the fifth intersection scenario.

At one or more temporal location, such as at each temporal location, the autonomous vehicle operational management controller may send, or otherwise make available, operational environment information, such as new or updated operational environment information, to previously instantiated, or operating, scenario-specific operational control evaluation module instances.

Instantiating, or updating, a scenario-specific operational control evaluation module instance may include providing the operational environment information, or a portion thereof, such as the sensor information or the probabilities of availability, to the respective scenario-specific operational control evaluation module instances, such as by sending the operational environment information, or a portion thereof, to the respective scenario-specific operational control evaluation module instances, or storing the operational environment information, or a portion thereof, for access by the respective scenario-specific operational control evaluation module instances.

In some embodiments, the operational environment information may indicate operational information for the autonomous vehicle 8100, such as geospatial location information, velocity information, acceleration information, pendency information, priority information, or a combination thereof, and operational information for one or more of the remote vehicles 8300, 8310, 8320, 8330, such as geospatial location information, velocity information, acceleration information, pendency information, priority information, or a combination thereof. The pendency information may indicate a temporal period corresponding to the respective vehicle and a respective geographic location, such a period of time that the respective vehicle has been stationary at the intersection. The priority information may indicate a right-of-way priority corresponding to a respective vehicle relative to other vehicles in the intersection scene 8000.

An intersection-scenario-specific operational control evaluation module may model an intersection scenario as including states representing spatiotemporal locations for the autonomous vehicle 8100, spatiotemporal locations for the respective remote vehicles 8300, 8310, 8320, 8330, pendency information, priority information, and corresponding blocking probabilities. An intersection-scenario-specific operational control evaluation module may model an intersection scenario as including actions such as 'stop' (or 'wait'), 'advance', and 'proceed'. An intersection-scenario-specific operational control evaluation module may model an intersection scenario as including state transition probabilities representing probabilities that a respective intersection enters an expected path of the autonomous vehicle, such as by traversing an expected path associated with the respective intersection. The state transition probabilities may be determined based on the operational environment information. An intersection-scenario-specific operational control evaluation module may model an intersection scenario as including negative value rewards for violating traffic control regulations, and including a positive value reward for completing the intersection scenario.

At one or more temporal location, such as at each temporal location, the respective intersection-scenario-specific operational control evaluation module instances may receive, or otherwise access, the operational environment information corresponding to the respective intersection scenarios. For example, in accordance with the first temporal location, the first intersection-scenario-specific operational control evaluation module instance may receive operational environment information corresponding to the first intersection scenario, which may include the probability of availability information for the area or portion of the vehicle transportation network proximate to the point of convergence between the first expected path 8400 for the first remote vehicle 8300 and the expected path 8110 for the autonomous vehicle 8100.

At one or more temporal location, such as at each temporal location, each instantiated intersection-scenario-specific operational control evaluation module instance may generate a respective candidate vehicle control action, such as 'stop', 'advance', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

At one or more temporal location, such as at each temporal location, the autonomous vehicle operational management controller may receive candidate vehicle control actions from the respective instantiated intersection-scenario-specific operational control evaluation module instances and may identify a vehicle control action based on the received candidate vehicle control actions for controlling the autonomous vehicle 8100 at the corresponding temporal location and may control the autonomous vehicle 8100 to traverse the vehicle transportation network, or a portion thereof, in accordance with the identified vehicle control action.

At one or more temporal location, such as at each temporal location, the autonomous vehicle operational management controller may determine whether one or more of the detected intersection scenarios has expired and, in response to determining that an intersection scenario has expired, may uninstantiate corresponding intersection-scenario-specific operational control evaluation module instances.

FIG. 9 is a diagram of an example of a lane change scene 9000 including a lane change scenario in accordance with embodiments of this disclosure. Autonomous vehicle operational management, such as the autonomous vehicle operational management 5000 shown in FIG. 5, may include an autonomous vehicle 9100, such as the vehicle 1000 shown in FIG. 1, one of the vehicles 2100, 2110 shown in FIG. 2, a semi-autonomous vehicle, or any other vehicle implementing autonomous driving, operating an autonomous vehicle operational management system, such as the autonomous vehicle operational management system 4000 shown in FIG. 4, including a lane change-scenario-specific operational control evaluation module instance, which may be an instance of a lane change-scenario-specific operational control evaluation module, such as the lane change-scenario-specific operational control evaluation module 4430 shown in FIG. 4, which may be a model of an autonomous vehicle operational control scenario that includes the autonomous vehicle 9100 traversing a portion of the vehicle transportation network by performing a lane change. For simplicity and clarity, the portion of the vehicle transportation network corresponding to the lane change scene 9000 shown in FIG. 9 is oriented with north at the top and east at the right.

The portion of the vehicle transportation network corresponding to the lane change scene 9000 shown in FIG. 9 includes the autonomous vehicle 9100 traversing northbound along a first road 9200. The first road 9200 include an eastern northbound lane 9210 and a western northbound lane 9220. A current expected path 9110 for the autonomous vehicle 9100 indicates that the autonomous vehicle 9100 is traveling northbound in the eastern northbound lane 9210. An alternative expected path 9120 for the autonomous vehicle 9100, shown using a broken line, indicates that the autonomous vehicle 9100 may traverse the vehicle transportation network by performing a lane change from the eastern northbound lane 9210 to the western northbound lane 9220.

A first remote vehicle 9300 is shown traversing northbound along the eastern northbound lane 9210 ahead (north) of the autonomous vehicle 9100. A second remote vehicle 9400 is shown traversing northbound along the western northbound lane 9220 behind (south) of the autonomous vehicle 9100.

The autonomous vehicle operational management system may include an autonomous vehicle operational management controller, such as the autonomous vehicle operational management controller 4100 shown in FIG. 4 or the executor 5100 shown in FIG. 5, and a blocking monitor, such as the blocking monitor 4200 shown in FIG. 4 or the blocking monitor 5200 shown in FIG. 5. The autonomous vehicle 9100 may include one or more sensors, one or more operational environment monitors, or a combination thereof.

In some embodiments, the autonomous vehicle operational management system may operate continuously or periodically, such as at each temporal location in a sequence of temporal locations. For simplicity and clarity, the geospatial location of the autonomous vehicle 9100, the first remote vehicle 9300, and the second remote vehicle 9400 is shown in accordance with a first, sequentially earliest, temporal location from the sequence of temporal locations. Although described with reference to a sequence of temporal locations for simplicity and clarity, each unit of the autonomous vehicle operational management system may operate at any frequency, the operation of respective units may be synchronized or unsynchronized, and operations may be performed concurrently with one or more portions of one or more temporal locations. For simplicity and clarity, respective descriptions of one or more temporal locations, such as temporal locations between the temporal locations described herein, may be omitted from this disclosure.

At one or more temporal location, such as at each temporal location, the sensors of the autonomous vehicle 9100 may detect information corresponding to the operational environment of the autonomous vehicle 9100, such as information corresponding to one or more of the remote vehicles 9300, 9400.

At one or more temporal location, such as at each temporal location, the autonomous vehicle operational management system may identify an expected path 9110, 9120 for the autonomous vehicle 9100, a route (not shown) for the autonomous vehicle 9100, or both.

At one or more temporal location, such as at each temporal location, the operational environment monitors of the autonomous vehicle 9100 may identify or generate operational environment information representing an operational environment, or an aspect thereof, of the autonomous vehicle 9100, such as in response to receiving sensor information corresponding to the remote vehicles 9300, 9400, which may include associating the sensor information with the remote vehicles 9300, 9400, and may output the operational environment information, which may include information representing the remote vehicles 9300, 9400, to the autonomous vehicle operational management controller.

At one or more temporal location, such as at each temporal location, the blocking monitor may generate probability of availability information indicating respective probabilities of availability for one or more areas or portions of the vehicle transportation network. For example, the blocking monitor may determine one or more probable expected paths 9310, 9320 for the first remote vehicle 9300, and one or more probable expected paths 9410, 9420 for the second remote vehicle 9400. The first probable expected path 9310 for the first remote vehicle 9300 indicates that the first remote vehicle 9300 traverses the corresponding portion of the vehicle transportation network in the eastern northbound lane 9210. The second probable expected path 9320, shown using a broken line, for the first remote vehicle 9300 indicates that the first remote vehicle 9300 traverses the corresponding portion of the vehicle transportation network by performing a lane change into the western northbound lane 9220. The first probable expected path 9410 for the second remote vehicle 9400 indicates that the second remote vehicle 9400 traverses the corresponding portion of the vehicle transportation network in the western northbound lane 9220. The second probable expected path 9420, shown using a broken line, for the second remote vehicle 9400 indicates that the second remote vehicle 9400 traverses the corresponding portion of the vehicle transportation network by performing a lane change into the eastern northbound lane 9210.

The blocking monitor may generate probability of availability information indicating respective probabilities of availability for one or more areas or portions of the vehicle transportation network corresponding to one or more of the expected path 9110 for the autonomous vehicle 9100, or the alternate expected path 9120 for the autonomous vehicle 9100.

In some embodiments, generating the probability of availability information may include generating probabilities of availability for a respective area or portion of the vehicle transportation network corresponding to multiple temporal locations from the sequence of temporal locations. The blocking monitor may output the probability of availability information to, or for access by, the autonomous vehicle operational management controller.

At one or more temporal location, such as at each temporal location, the autonomous vehicle operational management controller may generate operational environment information, or update previously generated operational environment information, which may include receiving the operational environment information or a portion thereof.

At one or more temporal location, such as at each temporal location, the autonomous vehicle operational management controller may detect or identify one or more distinct vehicle operational scenarios, such as based on the operational environment represented by the operational environment information, which may include the operational environment information output by the operational environment monitors, the probability of availability information output by the blocking monitor, or a combination thereof. For example, the autonomous vehicle operational management controller may detect or identify one or more of a first lane change scenario including the first remote vehicle 9300, a second lane change scenario including the second remote vehicle 9400, or both.

At one or more temporal location, such as at each temporal location, the autonomous vehicle operational management controller may instantiate one or more lane change-scenario-specific operational control evaluation module instances in response to detecting or identifying one or more of the first lane change scenario or the second lane change scenario.

At one or more temporal location, such as at each temporal location, the autonomous vehicle operational management controller may send, or otherwise make available, operational environment information, such as new or updated operational environment information, to previously instantiated, or operating, scenario-specific operational control evaluation module instances.

Instantiating, or updating, a scenario-specific operational control evaluation module instance may include providing the operational environment information, or a portion thereof, such as the sensor information or the probabilities of availability, to the respective scenario-specific operational control evaluation module instances, such as by sending the operational environment information, or a portion thereof, to the respective scenario-specific operational control evaluation module instances, or storing the operational environment information, or a portion thereof, for access by the respective scenario-specific operational control evaluation module instances.

In some embodiments, the operational environment information may indicate operational information for the autonomous vehicle 9100, such as geospatial location information, velocity information, acceleration information, or a combination thereof, and operational information for one or more of the remote vehicles 9300, 9400, such as geospatial location information, velocity information, acceleration information, or a combination thereof.

A lane change-scenario-specific operational control evaluation module may model a lane change scenario as including states representing spatiotemporal locations for the autonomous vehicle 9100, spatiotemporal locations for the respective remote vehicles 9300, 9400, and corresponding blocking probabilities. A lane change-scenario-specific operational control evaluation module may model a lane change scenario as including actions such as 'maintain', 'accelerate', 'decelerate', and 'proceed' (change lanes). A lane change-scenario-specific operational control evaluation module may model a lane change scenario as including state transition probabilities representing probabilities that a respective remote vehicle 9300, 9400 enters an expected path 9110, 9120 of the autonomous vehicle 9100. For example, the first remote vehicle 9300 may enter the alternate expected path 9120 of the autonomous vehicle 9100 by traversing the alternate expected path 9320 for the first remote vehicle 9300 at a velocity less than a velocity of the autonomous vehicle 9100. In another example, the second remote vehicle 9400 may enter the alternate expected path 9120 of the autonomous vehicle 9100 by traversing the expected path 9410 for the second remote vehicle 9400 at a velocity greater than the velocity of the autonomous vehicle 9100. The state transition probabilities may be determined based on the operational environment information. A lane change-scenario-specific operational control evaluation module may model a lane change scenario as including negative value rewards for violating traffic control regulations, and including a positive value reward for completing the lane change scenario.

At one or more temporal location, such as at each temporal location, the respective lane change-scenario-specific operational control evaluation module instances may receive, or otherwise access, the operational environment information corresponding to the respective lane change scenarios. For example, the second lane change-scenario-specific operational control evaluation module instance may receive operational environment information corresponding to the second lane change scenario, which may include the probability of availability information for the area or portion of the vehicle transportation network proximate to the point of convergence between the expected path 9410 for the second remote vehicle 9400 and the alternate expected path 9120 for the autonomous vehicle 9100.

At one or more temporal location, such as at each temporal location, each instantiated lane change-scenario-specific operational control evaluation module instance may generate a respective candidate vehicle control action, such as 'maintain', 'accelerate', 'decelerate', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

At one or more temporal location, such as at each temporal location, the autonomous vehicle operational management controller may receive candidate vehicle control actions from the respective instantiated lane change-scenario-specific operational control evaluation module instances and may identify a vehicle control action based on the received candidate vehicle control actions for controlling the autonomous vehicle 9100 at the corresponding temporal location and may control the autonomous vehicle 9100 to traverse the vehicle transportation network, or a portion thereof, in accordance with the identified vehicle control action.

At one or more temporal location, such as at each temporal location, the autonomous vehicle operational management controller may determine whether one or more of the detected lane change scenarios has expired and, in response to determining that a lane change scenario has expired, may uninstantiate corresponding lane change-scenario-specific operational control evaluation module instances.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
    traversing, by an autonomous vehicle, the vehicle transportation network, wherein traversing the vehicle transportation network includes:
        operating a scenario-specific operational control evaluation module instance, wherein the scenario-specific operational control evaluation module instance is an instance of a scenario-specific operational control evaluation module, wherein the scenario-specific operational control evaluation module implements a partially observable Markov decision process modeling a distinct vehicle operational scenario, wherein modeling the distinct vehicle operational control scenario includes:
            receiving a probability of availability for the portion of the vehicle transportation network from a blocking monitor instance; and
            modeling the distinct vehicle operational control scenario based on the probability of availability;
        receiving a candidate vehicle control action from the scenario-specific operational control evaluation module instance; and
        traversing a portion of the vehicle transportation network based on the candidate vehicle control action.

2. The method of claim 1, wherein traversing the portion of the vehicle transportation network includes traversing the portion of the vehicle transportation network in accordance with an identified route.

3. The method of claim 1, wherein the scenario-specific operational control evaluation module instance is associated with an external object within a defined geospatial distance from the autonomous vehicle.

4. The method of claim 1, wherein the scenario-specific operational control evaluation module instance is an instance of a scenario-specific operational control evaluation module from a plurality of scenario-specific operational control evaluation modules.

5. The method of claim 4, wherein each scenario-specific operational control evaluation module from the plurality of scenario-specific operational control evaluation modules models a distinct vehicle operational scenario.

6. The method of claim 1, wherein modeling the distinct vehicle operational scenario includes modeling sensor uncertainty.

7. The method of claim 1, wherein modeling the distinct vehicle operational control scenario includes:
    receiving sensor information from a sensor of the autonomous vehicle; and
    modeling the distinct vehicle operational control scenario based on the sensor information and the probability of availability.

8. The method of claim 7, wherein receiving the sensor information includes:
    receiving processed sensor information from a sensor information processing unit of the autonomous vehicle, the sensor information processing unit receiving the sensor information from the sensor of the autonomous vehicle and generating the processed sensor information based on the sensor information.

9. The method of claim 7, wherein modeling the distinct vehicle operational control scenario includes:
receiving vehicle transportation network information representing the vehicle transportation network; and
modeling the distinct vehicle operational control scenario based on the probability of availability, the sensor information and the vehicle transportation network information.

10. The method of claim 1, wherein modeling the distinct vehicle operational control scenario includes:
identifying a plurality of states;
identifying a plurality of vehicle control actions;
identifying a plurality of conditional transition probabilities, wherein each conditional transition probability from the plurality of conditional transition probabilities represents a probability of transitioning from a first respective state from the plurality of states to a second respective state from the plurality of states;
identifying a reward function, wherein the reward function generates a reward corresponding to transitioning from a first respective state from the plurality of states to a second respective state from the plurality of states;
identifying a plurality of observations, wherein the probability of availability is one of the plurality of observations, and wherein the sensor information includes one or more of the probability of observations; and
identifying a plurality of conditional observation probabilities, wherein each conditional observation probability from the plurality of conditional observation probabilities indicates a probability of accuracy for a respective observation from the plurality of observations.

11. The method of claim 10, wherein the plurality of states includes one or more of:
an indication of a current geospatial location of the autonomous vehicle;
an indication of a kinematic state of the autonomous vehicle;
an indication of a temporal period of the autonomous vehicle at the current geospatial location;
an indication of a current geospatial location of the external object;
an indication of a kinematic state of the external object;
an indication of a probability of availability corresponding to the external object; or
an indication of a priority for the autonomous vehicle relative to the external object.

12. The method of claim 10, wherein the plurality of vehicle control actions includes one or more of:
a stop vehicle control action;
a wait vehicle control action;
an accelerate vehicle control action;
a decelerate vehicle control action;
an advance vehicle control action;
or a proceed vehicle control action.

13. The method of claim 10, wherein, on a condition that transitioning from the first respective state from the plurality of states to the second respective state from the plurality of states includes violating a vehicle transportation network regulation, the reward function generates a penalty.

14. The method of claim 10, wherein, on a condition that the scenario-specific operational control evaluation module that implements the partially observable Markov decision process is unavailable, traversing the vehicle transportation network includes:
operating a scenario-specific operational control evaluation module instance that is an instance of a scenario-specific operational control evaluation module that implements a Markov decision process.

15. The method of claim 14, wherein operating the scenario-specific operational control evaluation module instance that is the instance of the scenario-specific operational control evaluation module that implements the Markov decision process includes:
generating the scenario-specific operational control evaluation module;
solving the scenario-specific operational control evaluation module; and
instantiating the scenario-specific operational control evaluation module instance.

16. A method for use in traversing a vehicle transportation network, the method comprising:
traversing, by an autonomous vehicle, the vehicle transportation network, wherein traversing the vehicle transportation network includes:
instantiating a scenario-specific operational control evaluation module instance that is an instance of a scenario-specific operational control evaluation module that implements a partially observable Markov decision process modeling a distinct vehicle operational control scenario, wherein modeling the distinct vehicle operational control scenario includes:
identifying a plurality of states corresponding to the distinct vehicle operational control scenario;
identifying a plurality of available vehicle control actions based on the distinct vehicle operational control scenario;
identifying a plurality of conditional transition probabilities, wherein each conditional transition probability from the plurality of conditional transition probabilities represents a probability of transitioning from a first respective state from the plurality of states to a second respective state from the plurality of states;
identifying a reward function, wherein the reward function generates a reward corresponding to transitioning from a first respective state from the plurality of states to a second respective state from the plurality of states;
identifying a plurality of observations, each observation from the plurality of observations corresponding to a respective state from the plurality of states; and
identifying a plurality of conditional observation probabilities, wherein each conditional observation probability from the plurality of conditional observation probabilities indicates a probability of accuracy for a respective observation from the plurality of observations;
receiving a candidate vehicle control action from the scenario-specific operational control evaluation module instance; and
traversing a portion of the vehicle transportation network based on the candidate vehicle control action.

17. An autonomous vehicle comprising:
a processor configured to execute instructions stored on a non-transitory computer readable medium to:
operate a scenario-specific operational control evaluation module instance, wherein the scenario-specific operational control evaluation module instance is an instance of a scenario-specific operational control evaluation module, wherein the scenario-specific operational control evaluation module implements a partially observable Markov decision process, wherein the processor is configured to execute the instructions stored on the non-transitory computer readable medium to operate the scenario-specific operational control evaluation module instance to:

identify a plurality of states for a distinct vehicle operational scenario;

identify a plurality of vehicle control actions for the distinct vehicle operational scenario;

identify a plurality of conditional transition probabilities, wherein each conditional transition probability from the plurality of conditional transition probabilities represents a probability of transitioning from a first respective state from the plurality of states to a second respective state from the plurality of states;

identify a reward function, wherein the reward function generates a reward corresponding to transitioning from a first respective state from the plurality of states to a second respective state from the plurality of states;

identify a plurality of observations, each observation from the plurality of observations corresponding to a respective state from the plurality of states; and identify a plurality of conditional observation probabilities, wherein each conditional observation probability from the plurality of conditional observation probabilities indicates a probability of accuracy for a respective observation from the plurality of observations;

receive a candidate vehicle control action from the scenario-specific operational control evaluation module instance; and control the autonomous vehicle to traverse a portion of the vehicle transportation network based on the candidate vehicle control action.

* * * * *